United States Patent [19]

Tofte et al.

[11] Patent Number: 5,260,875
[45] Date of Patent: Nov. 9, 1993

[54] NETWORKED AGRICULTURAL MONITORING AND CONTROL SYSTEM

[75] Inventors: David S. Tofte, Mankato, Minn.; Richard Heiniger, Hiawatha, Kans.; Steven W. Vogel, North Mankato, Minn.

[73] Assignee: Micro-Trak System, Inc., Eagle Lake, Minn.

[21] Appl. No.: 748,182

[22] Filed: Aug. 20, 1991

[51] Int. Cl.[5] .................... G06F 7/70; G06F 15/48; G06G 7/00
[52] U.S. Cl. .................. 364/424.07; 364/424.01; 364/551.01
[58] Field of Search ............ 364/424.01, 424.07, 364/551.01, 424.03, 424.04; 356/246

[56] References Cited

U.S. PATENT DOCUMENTS

| | | | |
|---|---|---|---|
| 3,680,967 | 8/1972 | Engelhardt | 356/246 |
| 3,983,366 | 9/1976 | Gunn | 356/246 |
| 4,015,366 | 4/1977 | Hall, III | 364/172 |
| 4,121,767 | 10/1978 | Jensen | 239/71 |
| 4,274,585 | 6/1981 | Lestradet | 239/164 |
| 4,296,409 | 10/1981 | Whitaker et al. | 340/684 |
| 4,358,054 | 11/1982 | Ehrat | 239/155 |
| 4,376,298 | 3/1983 | Sokol et al. | 364/551.01 |
| 4,553,702 | 11/1985 | Coffee et al. | 239/3 |
| 4,580,721 | 4/1986 | Coffee et al. | 239/3 |
| 4,614,300 | 9/1986 | Falcoff | 239/71 |
| 4,714,196 | 12/1987 | McEachern et al. | 239/62 |
| 4,715,012 | 12/1987 | Mueller, Jr. | 364/424.07 |
| 4,803,626 | 2/1989 | Bachman et al. | 364/424.07 |
| 4,805,088 | 2/1989 | Cross et al. | 364/172 |
| 4,807,544 | 2/1989 | Cross et al. | 111/7 |
| 4,893,241 | 1/1990 | Girodat et al. | 364/424.07 |
| 4,895,303 | 1/1990 | Freyvogel | 239/61 |
| 4,924,413 | 5/1990 | Bachman et al. | 364/550 |
| 4,967,957 | 11/1990 | Bachman | 239/62 |
| 5,014,914 | 5/1991 | Wallenas | 239/62 |
| 5,075,857 | 12/1991 | Maresca | 364/421 |
| 5,181,616 | 1/1993 | Le Gigan | 209/31 |

OTHER PUBLICATIONS

"Injection Closed System Sprayers" by A. J. Landers, *Pesticide Outlook*, vol. 1, No. 1, 1989. pp. 27–30.
"Raven ® Chemical Injection Spray Systems," Raven Industries, Inc., Sioux Falls, South Dakota.

*Primary Examiner*—Thomas G. Black
*Assistant Examiner*—J. H. Louis-Jacques
*Attorney, Agent, or Firm*—Merchant, Gould, Smith, Edell, Welter & Schmidt

[57] ABSTRACT

A controller system having a half-duplex serial line as a bus for transferring commands, status and data between all controllers in a planting and spraying system. A bus master connected to the serial line synchronizes each controller to the network while a base console coordinates the operation of each planting and spraying system. Separate system controllers operate in conjunction with each system accessory module to control the components of each planting and spraying system. Operation of a spray control module is controlled by the sprayer control console, operating in conjunction with a base console. A planter monitor module provides control over a plurality of components in a seed-planting system. A base console with a primary user interface and a planter controller console with a planter user interface are connected to the planter monitor module over a communications medium. Operation of the planter monitor module is controlled by the planter controller console operating in conjunction with the base console.

18 Claims, 23 Drawing Sheets

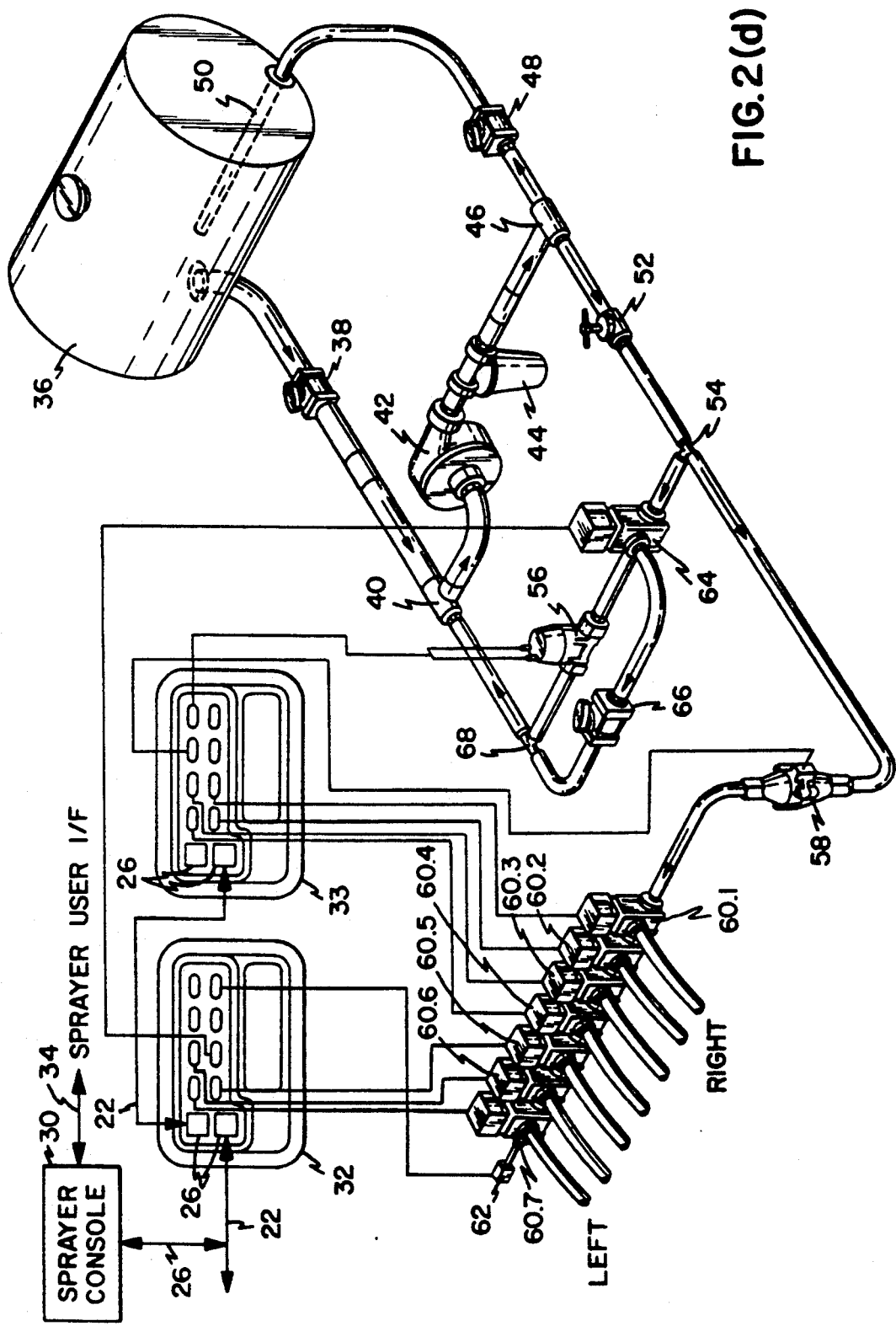

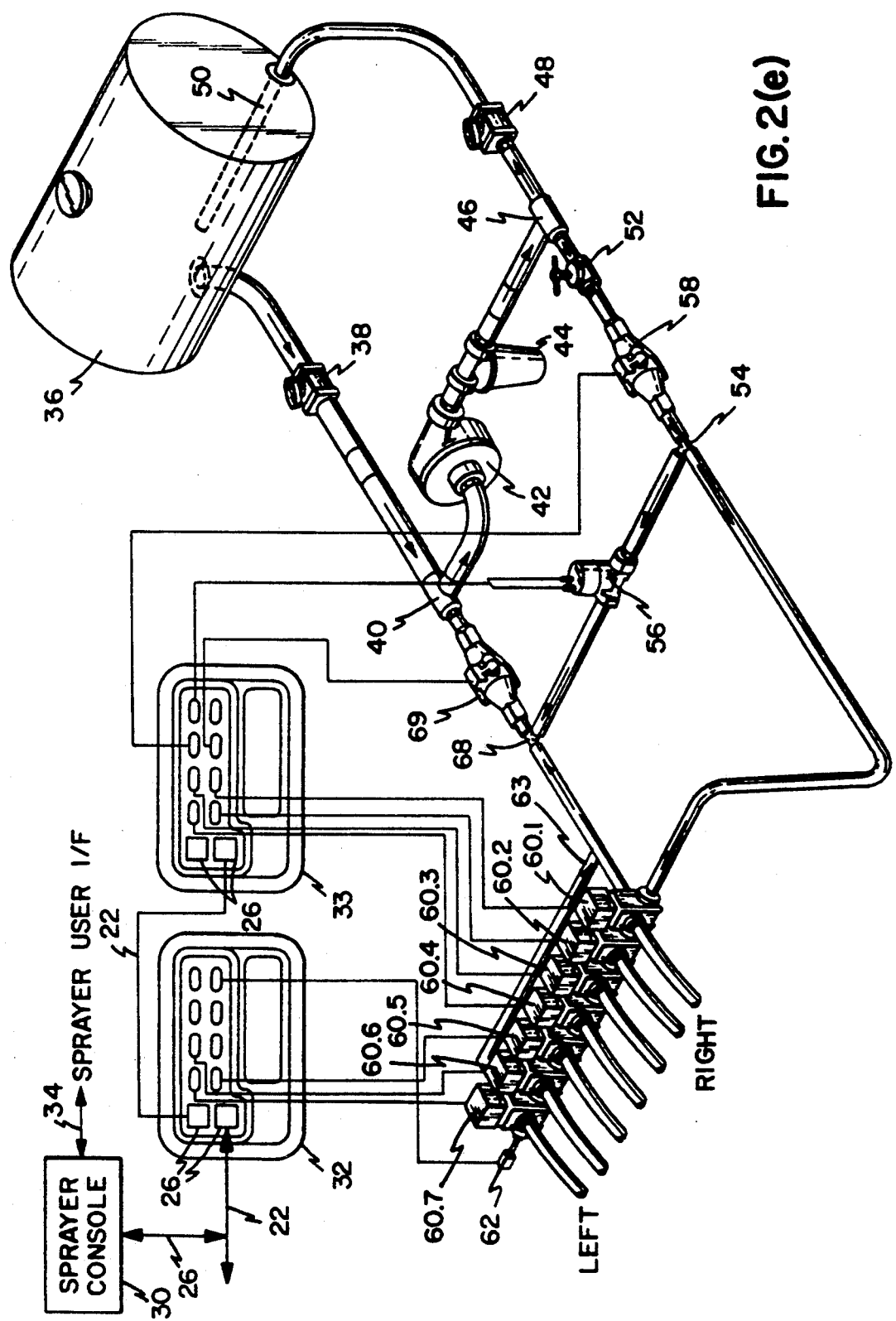

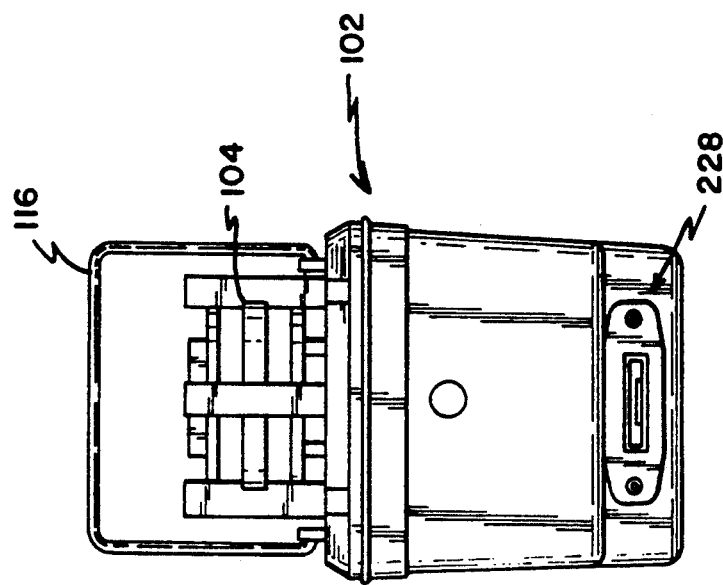
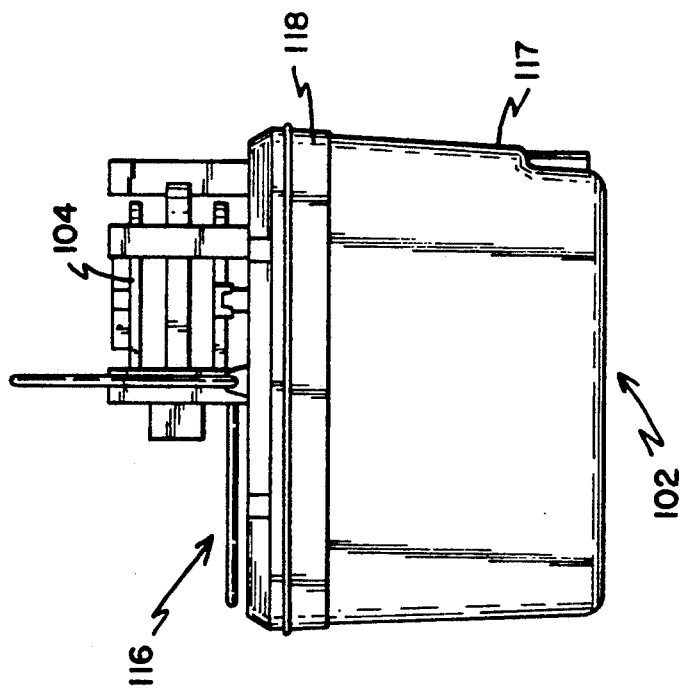
FIG.17

NETWORKED AGRICULTURAL MONITORING AND CONTROL SYSTEM

FIELD OF THE INVENTION

The present invention relates to a system for the monitor and control of farm implements, and more particularly to an integrated network of controllers which permit a modular, distributed, improved control of agricultural implements.

BACKGROUND OF THE INVENTION

Planting and spraying systems have increasingly become more sophisticated and better able to handle the variety of applications presented by the agricultural industry. With this sophistication has come the need to further integrate the functions of planting and spraying control to provide a cost effective farm implement control environment.

Many farm implements are controlled by the operator of the agricultural vehicle to which the implements are attached or coupled. For example, planting and spraying systems have evolved for controlling and monitoring planting and spraying implements, respectively. These systems, however, have for the most part evolved separately.

Automated seed planters in planting systems usually include a plurality of seed feeders which serve as conduits for the seeds moving to the planting devices. Because seed feeders can become obstructed during planting, causing rows of crop land to be misplanted, planting systems use planter monitors to monitor the flow of seeds through the seed feeders and detect jams.

The first planter monitors used electromechanical switches to detect the passage of seeds through the seed feeders. Later systems used optical sensors for this purpose. A system for detecting the passage of seeds by monitoring changes in electrical fields caused by the movement through the field of objects with a high dielectric constant (such as seeds) was disclosed in Haase U.S. Pat. No. 4,710,757, the entire disclosure of which is hereby incorporated by reference. The Haase system uses sensors connected to a microcontroller to detect the passage of seeds.

A variety of spraying systems are commercially available. Standard spraying systems regulate the amount of product to be applied to a field by diluting the product in a carrier fluid and then controlling system pressure such that the volume of the product/carrier fluid combination sprayed varies with the speed of the application vehicle. As long as the application vehicle maintains a relatively constant speed, these systems do an adequate job of controlling application of the product. However, under conditions of varying vehicle speed (e.g. applications on undulating land), it is difficult to achieve the large pressure changes required to accommodate abrupt changes in vehicle speed and the associated quick adjustments to rate of fluid application.

An alternative approach to standard spraying is to directly inject the concentrated product into a constant flow of carrier. Various systems for direct injection spraying are described in "Injection Closed System Sprayers", written by A.J. Landers and published in 1989 in *Pesticide Outlook*. Direct injection spraying systems reduce exposure of the operator to the product, reduce overdosing and underdosing in product application, increase flexibility of applications by permitting spot treatment and adjustment of the dosages, and increase accuracy of metering.

At the same time, agricultural controllers have evolved to better control the operation of farm implements used in planting and spraying systems. Among the first controllers were hard-wired devices such as that disclosed in Allman et al. U.S. Pat. No. 4,093,107 for use in a spraying system. Spraying systems with this type of controller required a high level of sophistication on the part of the user and were difficult to adapt to changes in system parameters such as boom width.

Other controllers, such as those disclosed in Lestradet U.S. Pat. No. 4,023,020, Kays U.S. Pat. No. 4,220,998 and McGlynn U.S. Pat. No. 4,013,875, achieved greater flexibility by teaching the use of electronic computer elements for the control and monitoring of farm implements.

Recent controllers, such as that disclosed in Bachman et al. U.S. Pat. No. 4,803,626 which is hereby incorporated by reference, present an even more flexible controller system which is programmed to accept a variety of different types of implement controls and sensors. Flowmeters, valves and other equipment are no longer limited to the original equipment. Sprayers can be fabricated from a wide variety of components, including components manufactured by rival companies.

A system like the one described by Bachman et al. demonstrates the improved flexibility possible through the use of microcontrollers and programmable I/O. However the Bachman system provides no paths for communicating the status of those components or the results of the spraying operation to other devices. In addition, the wiring between the controller and the remainder of the system is not readily adaptable for expansion to include control of other devices.

Current agricultural control systems still require a separate planting controller for planting systems and a spraying controller for spraying systems. There are no mechanisms for the sharing of information gathered during each operation or the incorporation of shared information to improve implement control. The separation of the two functions means that either individual passes must be made through a field for planting, fertilizing and pesticide application or the application vehicle must be cluttered with a multitude of incompatible controller equipment, each with its own unique calibration, maintenance and operational needs.

Furthermore, separate cables must be routed from each system component to its associated controller. The result is a jumble of wiring and reduced system reliability. Sensors that are to be used by more than one system must by necessity be connected to each system. As the types of sensors used in spraying and planting increase in number and the sensors become more complex, the information they generate could be profitably shared by many applications, but cannot be shared without further increasing the complexity, and potential misconnection and other wiring problems, of wiring.

An integrated system of planting and spraying which allows for sharing of data between each controller in the system and minimizes the amount of wiring in the system would be beneficial.

SUMMARY OF THE INVENTION

The present invention addresses this need by providing a distributed controller system which uses a half-duplex serial line as a bus that can be used to transfer commands, status and data between all controllers in a planting and spraying system. A bus master connected to the serial line synchronizes each controller to the network while a base console coordinates the operation of each planting and spraying system and presents a simple, uniform user interface. Separate system controllers operate in conjunction with system accessory modules to control the components of each planting and spraying system.

In systems according to the present invention, component cabling is simplified by terminating each cable at an accessory module located close to the components controlled. Data related to each component is then transferred from the accessory modules to the controllers on the single serial line.

This separation of the accessory modules from their associated controllers leads to efficient and logical system partitioning. Accessory modules can be placed in close proximity to the components they control while base and subsystem controllers are placed close to the user.

The present invention provides an integrated network of controllers for the monitoring and control of an agricultural planting and spraying system. A system is partitioned into one or more planting, spraying and monitoring subsystems with each subsystem controlled by a subsystem controller. A half-duplex serial communications network connects the subsystem controllers to each other and to a base console which coordinates the user interface. A bus master synchronizes message traffic on the network by periodically sending a synchronizing message to the controllers. In operation, each subsystem controller monitors traffic on the network to determine when to read data on the network and when to drive data onto the network. Data present on the network can be read by more than one controller at a time. This simplifies the sharing of information present on the network.

According to another aspect of the present invention, in a sprayer subsystem constructed according to this method, a spray control module is provided to control a plurality of components in a sprayer subsystem. A base console with a primary user interface and a sprayer controller console with a sprayer user interface are provided and connected to the spray control module over a communications medium. Operation of the spray control module is controlled by the sprayer controller console operating in conjunction with the base console. Calibration of the spray control module and the sprayer controller console are performed from the base console.

According to yet another aspect of the present invention, in a planting subsystem constructed according to this method, a planter monitor module is provided to control a plurality of components in a seed planting system. A base console with a primary user interface and a planter controller console with a planter user interface are provided and connected to the planter monitor module over a communications medium. Operation of the planter monitor module is controlled by the planter controller console operating in conjunction with the base console. Calibration of the planter monitor module and the planter controller console are performed from the base console.

According to yet another aspect of the present invention, a method is provided for recording actions and events that occur during operation of the planting and spraying apparatus and for repeating those actions at a later date.

According to yet another aspect of the present invention, a direct injection spraying system provides control not only on the flow of the product but also on the flow of the carrier.

According to yet another aspect of the present invention, a method of identifying containers is disclosed which helps to avoid the problems associated with the misidentification or misapplication of pesticide and fertilizer products.

BRIEF DESCRIPTION OF THE DRAWINGS

FIGS. 2(a) through 2(e) are electrical and plumbing diagrams representative of sprayer subsystems according to the present invention.

FIG. 17 is a mechanical drawing of the pump pack and injection pump used in one embodiment of the present invention.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
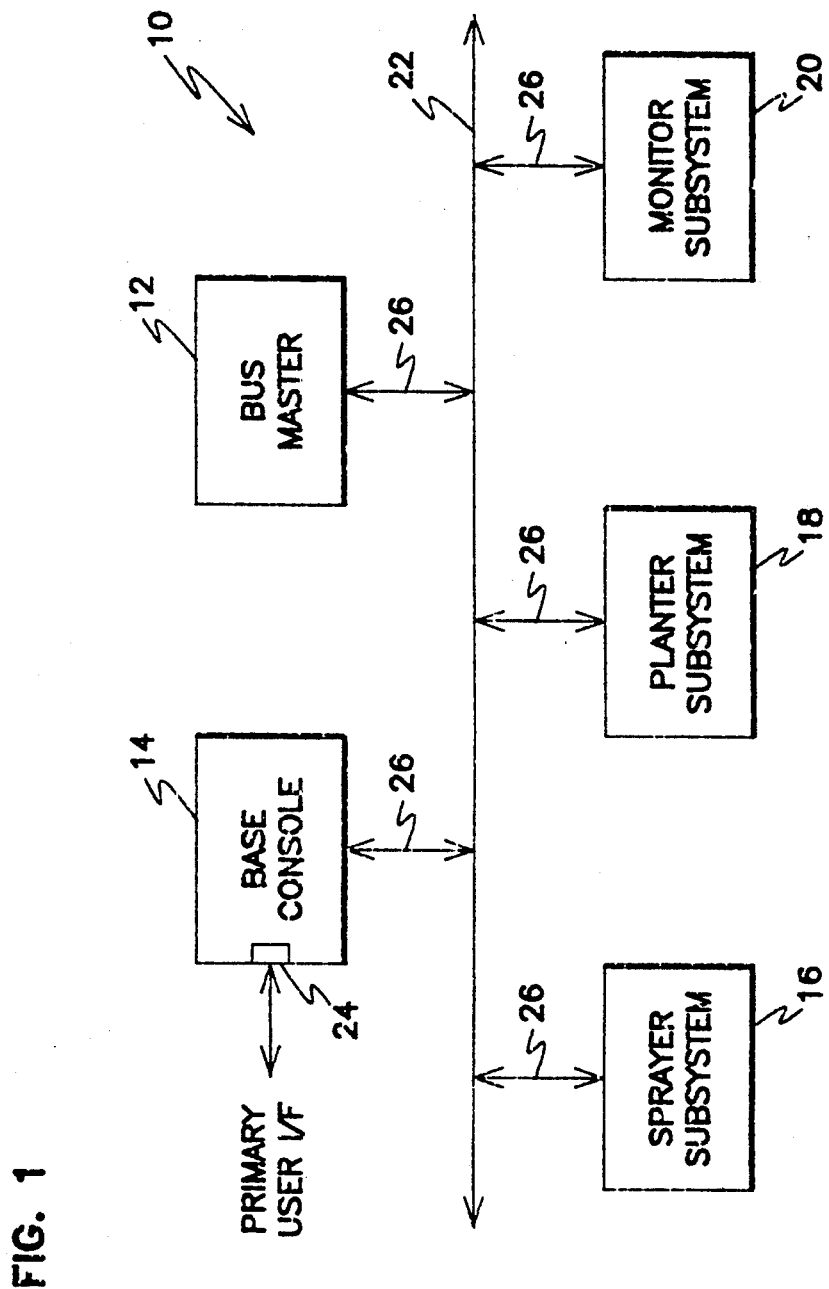
FIG. 1 is a system block diagram of an integrated agricultural planting and spraying system in accord with the present invention.

An integrated agricultural planting and spraying system 10 is shown in FIG. 1. Planting and spraying system 10 consists of an integrated network of controllers for the monitoring and control of planting and spraying. System 10 includes a bus master 12, a base console 14, a sprayer subsystem 16, a planter subsystem 18, a monitor subsystem 20 and a communications medium such as bus 22. Elements 12 through 20 are capable of communicating to each other through a standard communications network connection such as media interface 26 to bus 22. Bus master 12 controls the operation of bus 22 and, in the preferred embodiment, serves as the data gathering node for inter-system communications.

Base console 14 is the primary user interface. Base console 14 receives user input and displays system status through primary user interface means 24. Sprayer subsystem 16 receives spraying instructions entered through the base console and controls components of the sprayer subsystem in order to execute those instructions. Likewise, planter subsystem 18 receives instructions through base console 14, executes those instructions and returns planter subsystem status. Monitor subsystem 20 is capable of recording data traffic present on bus 22 and storing the data read from bus 22 to non-volatile memory for future playback. In one embodiment, sprayer subsystem 16 and planter subsystem 18 have separate subsystem user interfaces that operate in conjunction with base console 14 to monitor and control subsystem operation.

The combination of bus master 12, base console 14, sprayer subsystem 16, planter subsystem 18 and monitor subsystem 20 is very powerful. In one preferred embodiment primary user interface 24 comprises a first switch for accessing a plurality of screen displays for display to the user and a second switch for modifying status and control information associated with base console 14 or one of the subsystems 16, 18 or 20.

In that embodiment, the mode of operation for system 10 is controlled by base console 14. Possible system modes include normal, calibration, sigma, initialization and debug. The first switch is used to select the mode; the second switch controls variables within the chosen mode.

Bus master 12 operating in conjunction with base console 14 controls each of the subsystems in system 10. This includes such functions as identifying each sensor device and implement to be managed, accessing program code and data stored in memory associated with base console 14 to operate such sensor device and implement, receiving control information from primary user interface 24, displaying status through display 24, generating control signals for controlling each sensor device and implement and supplying these control signals through bus 22 to the appropriate device.

Sensor devices and implements are grouped into subsystem and identified by a subsystem code. During initialization, each subsystem controller transfers a subsystem status including a subsystem code indicating the type of subsystem (sprayer, planter, monitor, etc.) to bus master 12 and base console 14. Bus master 12 and base console 14, in turn, record the existence of that subsystem and control primary user interface 24 accordingly.

Since more than one subsystem of a specific type can be connected to system 10 at one time, each subsystem is assigned a unique system number. The system number is assigned by bus master 14 or by the operator. The system number then serves as the identifier for all transactions between base console 14, bus master 12 and a specific subsystem.

In addition, as part of initialization all subsystem components that are connected to bus 22 must be assigned to a subsystem number. In one embodiment, a unique serial number is attached to each component. This serial number is then used to address that component and inform it of the system number of the subsystem to which it has been assigned and at the same time assigns it a module number which will be used for further communication with the component.

Other subsystems could be added to system 10 by connecting them through standard media interface 26 to bus 22. One candidate subsystem would be a navigation subsystem using the Global Positioning Satellite (GPS) system to acquire accurate position information. Such information would be valuable to an equipment operator seeking to repeat applications to specific areas of a field or to a spraying subsystem 16 which might use altitude information to control the rate of application to compensate for altitude. An alternate embodiment of such a system might use a compass and an altimeter to approximate the same results.

Another candidate subsystem would be a system maintenance subsystem. A system maintenance subsystem could be used to debug a system both in production and in the field. Functions it could perform might include testing communication on bus 22 or emulating operation of bus master 12, base console 14 or one or more of the subsystems in the system.

Subsystem Definition

Figure 2A:
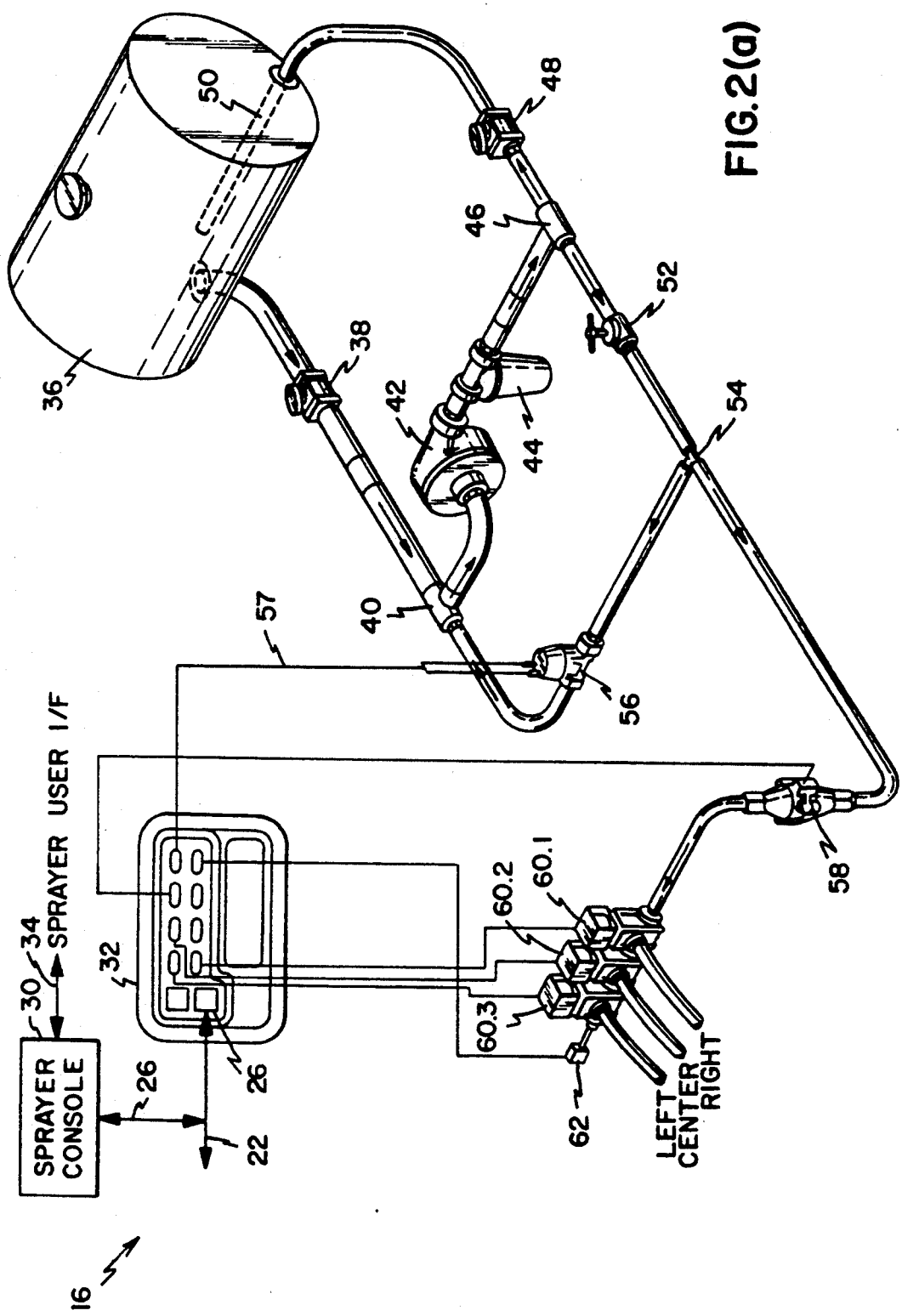

A preferred embodiment of sprayer subsystem 16 is shown in FIG. 2(a). Sprayer subsystem 16 includes a sprayer console 30 and a sprayer accessory module 32 connected through media interface 26 to bus 22 and the remaining elements of system 10. Sprayer console 30 provides a sprayer user interface 34 for use in conjunction with user interface 24 to control sprayer subsystem 16. Sprayer accessory module 32 controls the electromagnetic components which regulate fluid flow through sprayer subsystem 16. Module 32 also monitors sensors indicative of subsystem 16 operation.

In one embodiment, sprayer subsystem 16 is connected to an output of carrier tank 36 through tank shut-off valve 38 and to a carrier agitator 50 through agitation shut-off valve 48. Connection of the electromechanical, mechanical and plumbing elements of a sprayer system such as shown in FIG. 2(a) is well known in the art.

In FIG. 2(a), tank shut-off valve 38 is connected in turn to plumbing tee 40. Plumbing tee 40 is connected to pump 42 and servo valve 56. Pump 42 pumps the fluid drawn from carrier 35 through filter 44 to plumbing tee 46. Plumbing tee 46 divides the fluid such that a portion of the fluid is pumped through agitation shut-off valve 48 to carrier agitator 50 embedded in carrier tank 36.

The remaining fluid passes through throttle valve 52 and into plumbing tee 54. A portion of the fluid passing through plumbing tee 54 is drawn through servo valve 56 and passed back into plumbing tee 40. Servo valve 56 provides a feedback mechanism capable of controlling fluid pressure within subsystem 16. Use of such a valve is well known in the art.

Plumbing tee 54 is also connected through flow meter 58 to boom solenoid valves 60.1 through 60.3. In one embodiment, boom solenoid valves 60.1 through 60.3 are connected in series. This type of connection provides an internal manifold which equalizes subsystem pressure to each of the booms. This pressure is monitored with pressure sensor 62.

Servo valve 56, flow meter 58, boom solenoid valves 60.1-3 and pressure sensor 62 are electrically connected to sprayer accessory module 32. Servo control in module 32 controls operation of servo valve 56 with a three wire system including an H driver used to send pulse width modulated signals down to servo valve 56. Module 32 monitors the volume of fluid passing through flow meter 58 and the subsystem pressure sensed by pressure sensor 62 and controls servo valve 56 in order to maintain the subsystem pressure necessary to guarantee regular spray patterns from the sprayer booms. In addition, sprayer accessory module 32 has the capability of individually turning on or off each of boom solenoid valves 60.1 through 60.3. In an alternate embodiment, servo valve 56 includes position feedback connected to sprayer accessory module 32 through servo control cable 57 and used for feeding back a voltage representative of the position of the servo valve.

Boom solenoid valve current is reduced in system 10 by modulating the signal provided to open the valve such that on average less current is used. In operation, the valve is energized for one second in order to cause the transition and then pulsed at approximately a 50% duty cycle to maintain that position.

Figure 2B:
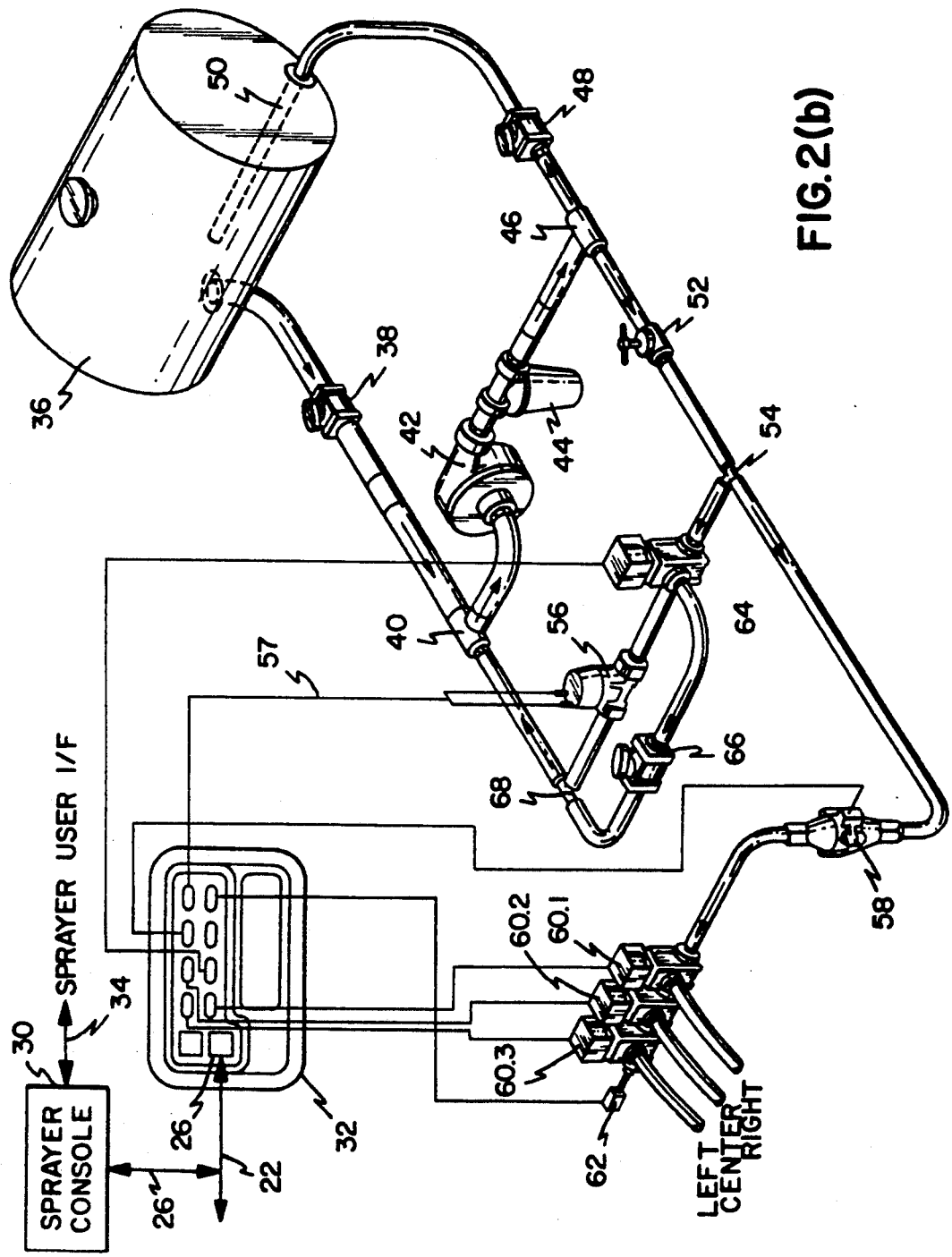

A second embodiment of sprayer subsystem 16 is shown in FIG. 2(b). In FIG. 2(b), a boost solenoid valve 64 has been inserted between plumbing tee 54 and servo valve 56 and an additional plumbing tee 68 has been inserted between servo valve 56 and plumbing tee 40. Boost solenoid valve 54 is capable of bypassing servo valve 56 by redirecting fluid through a boost adjust valve 66 connected between boost solenoid valve 64 and plumbing tee 68. In one embodiment, boost solenoid valve 64 is electrically connected to sprayer accessory module 32. Boost solenoid valve 64 and boost adjust valve 66 provide a mechanism for bypassing servo valve 56 under control of sprayer accessory module 32. In normal operation, this would be done in order to minimize the pressure changes seen by subsystem 16 when solenoid valves 60.1 through 60.3 are shut off.

Figure 2C:
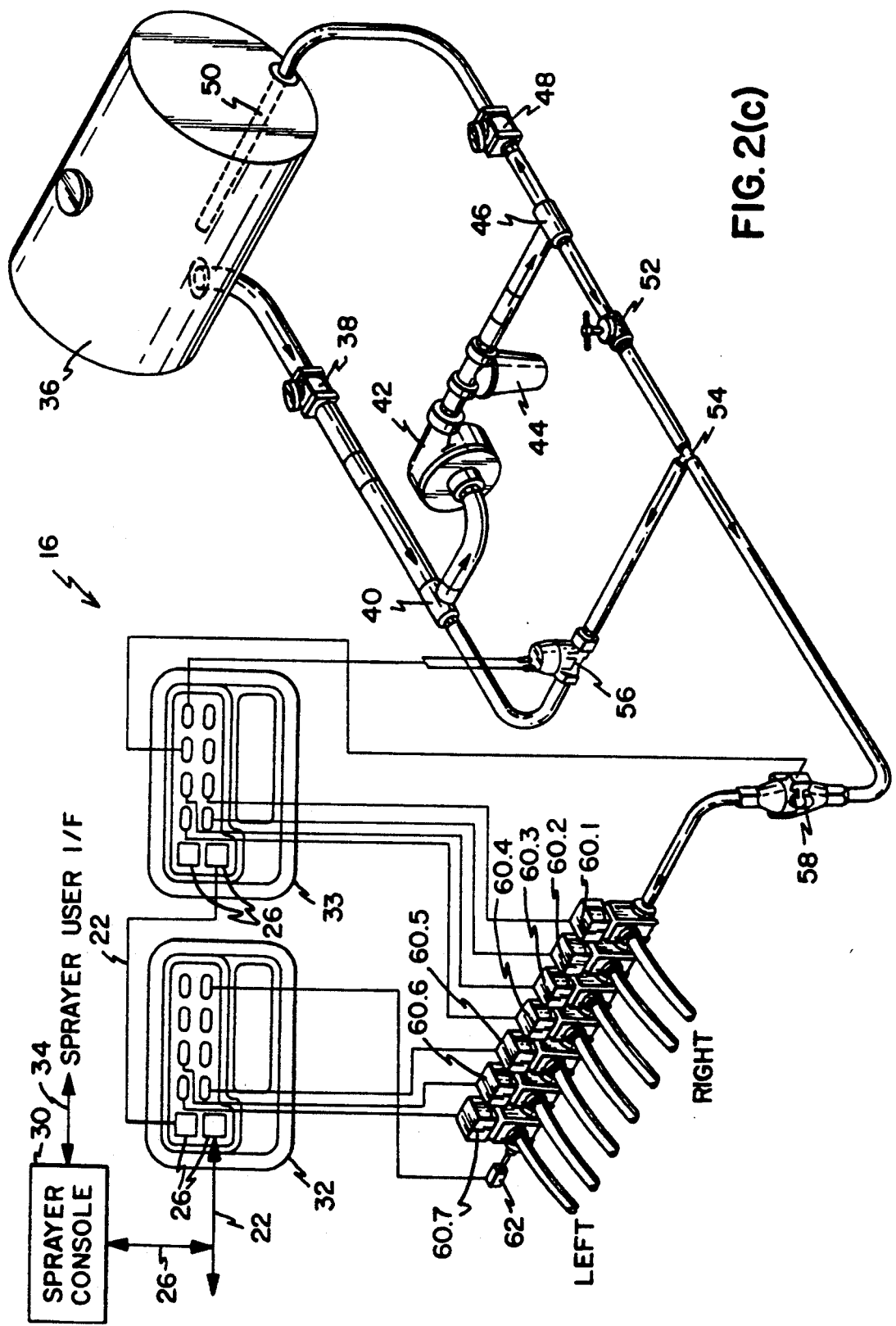

A third embodiment of sprayer subsystem 16 is shown in FIG. 2(c). In this embodiment, four additional boom solenoid valves 60 have been added to the plumbing of FIG. 2(a) to increase the spray width of the application vehicle. A boom extension accessory module 33 connected to bus 22 through interface 26 has been added to system 10 to control operation of the additional booms.

In this embodiment, boom solenoid valves 60.1 through 60.4 are controlled by boom extension module 33. In addition extension module 33 controls servo valve 56 and monitors flowmeter 58. Also in this embodiment, sprayer accessory module 32 controls boom solenoid valves 60.5 through 60.7 and continues to monitor pressure sensor 62.

The addition of up to four booms to the system of FIG. 2(b) is illustrated in FIG. 2(d). In one embodiment, sprayer accessory module 32 continues to control boost solenoid valve 64.

The use of a pressure equalizing system such as boost solenoid valve 64 and boost adjust valve 66 to reduce pressure transients by diverting fluid back to the input of pump 42 increases in importance as the number of booms supplied by subsystem 16 increase. With seven booms operating, pressure transients caused by opening and closing the seven boom solenoid valves 60 in unison can cause pressure transients which increase wear and may even damage the subsystem.

An alternate embodiment of a pressure equalizing system such as that shown in FIG. 2(d) is illustrated generally in FIG. 2(e). In a system constructed according to FIG. 2(e), boom solenoid valves 60 used in the previous figures are replaced with boom three-way valves 61 which direct fluid either to the booms or back through manifold 63 to plumbing tee 68. In one embodiment, manifold 63 would constrict the flow of fluid routed to tee 68 in order to approximate the flow of fluid through the booms. The remainder of subsystem 16 could remain unaware of the direction of fluid flow. In an alternate embodiment a manifold adjust valve could be added between manifold 63 and tee 68 to perform the constriction of the fluid.

FIG. 2(e) also shows an alternative method of measuring fluid flow through the system. A flowmeter 69 is placed between plumbing tee 68 and plumbing tee 40 and flowmeter 58 is moved between throttle valve 52 and plumbing tee 54. In this embodiment, with boom valves 61 all directing fluid to the booms, flowmeter 58 measures the amount of fluid delivered to tee 54 and flowmeter 68 measures the amount of fluid returned through valve 56. Therefore the amount of fluid being delivered to the booms is the difference between the readings of flowmeter 58 and flowmeter 69.

When one or more boom valves 61 are directing fluid back through manifold 63 to tee 68, flowmeter 69 should see the amount of fluid flowing through tee 68 increase as a function of the number of valves 61 redirecting fluid. Therefore it is relatively easy to measure fluid delivered to the booms.

Figure 3:
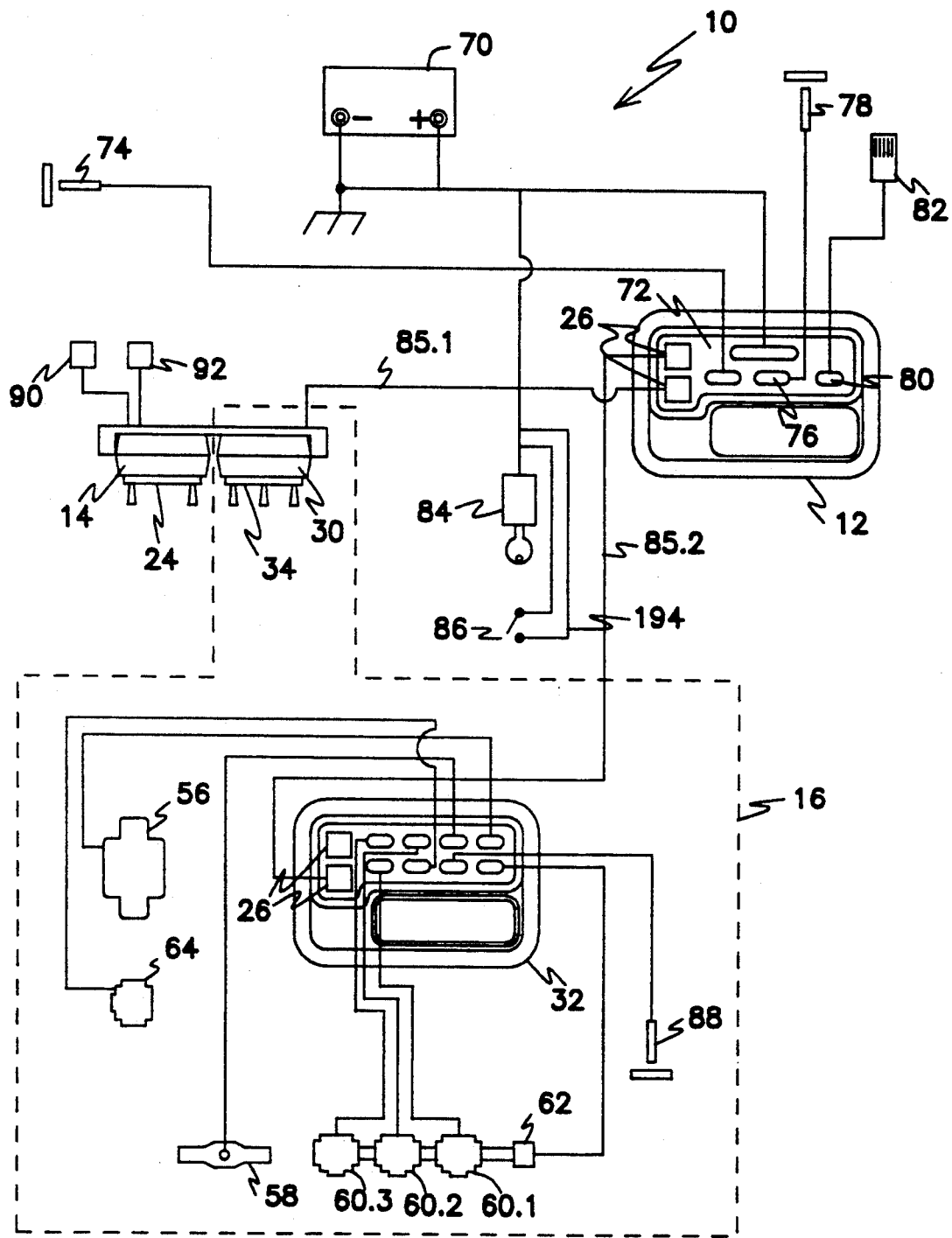
FIG. 3 is an electrical block diagram representative of a sprayer subsystem working in conjunction with the bus master and base console according to the present invention.

FIG. 3 illustrates a preferred embodiment of a sprayer subsystem 16 connected by cables 85.1 and 85.2 to a bus master 12 and a base console 14. Cables 85 include bus 22 (bus 22 is electrically connected across cables 85.1 and 85.2 by bus master 12). In one embodiment, bus 22 is a half duplex serial line which connects consoles 14 and 30, bus master 12 and sprayer accessory module 32 in a daisy chain fashion. Planter subsystem 18 and monitor subsystem 20 are not shown in FIG. 3. They can be connected in like manner by adding them to the daisy chain. It should be noted that, although bus master 12 is shown in the middle of the daisy chain of FIG. 3, the order of elements of system 10 in the daisy chain is not important. It is, however, important to terminate each end of the daisy chain with the appropriate termination and to minimize the path to high current subsystems.

System 10 is commonly mounted on a tractor or other vehicle. Power to system 10 is provided by a battery 70 connected through heavy gauge wire to bus master 12. In one embodiment, bus master 12 serves as the power supply for system 10. System power and system ground are transmitted by bus master 12 on interconnect cables 85. In addition, bus master 12 includes a speed sensor input 72 for receiving an electrical signal from a speed sensor 74, a run/hold sensor input 76 for receiving a remote run/hold signal from a run/hold sensor 78 and an alarm output 80 capable of being connected to an external speaker 82 for transmitting audio alarms.

One embodiment of system 10 operates from the 12 volts of a negatively-grounded vehicle electrical system. The +12 volt side of the electrical system is connected through an ignition switch 84 so that power is provided to system 12 only when ignition switch 84 is in the "on" position. In addition, the user has the option of installing an accessory power switch 86 which can be used to prevent bus master 12 from energizing the power line within cable 85.2. Switch 86 is useful for keeping such things as sprayer components in an "OFF" state while permitting user interaction with the base console and each of the subsystem consoles. It is recommended that systems using switch 86 have all consoles placed on cable 85.1 in order to facilitate operation of the consoles when the accessory modules are in the powered down state.

In one embodiment, a secondary run/hold sensor 88 can be connected to accessory module 32 in order to provide selective subsystem run/hold capabilities. Optionally, in an alternate embodiment, run/hold sensor 78 can be connected to run/hold sensor input 90 of base console 14 and speed sensor 74 can be connected to speed sensor input 92 of base console 14. This option is made available in one embodiment of the present invention in order to give the system installer flexibility in installing system 10.

Figure 4:
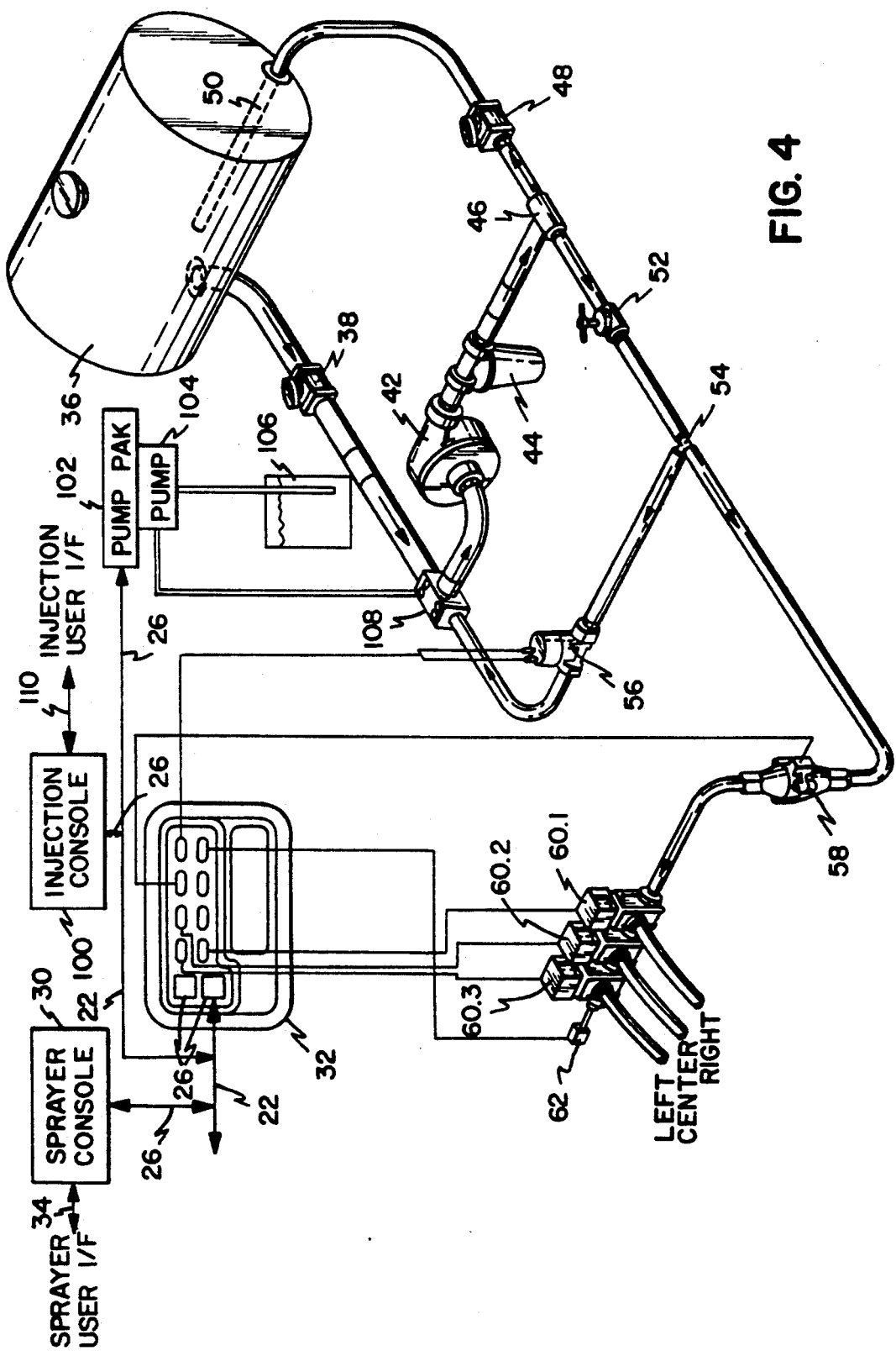
FIG. 4 is an electrical diagram of a direct injection sprayer subsystem in accord with the present invention.

A preferred embodiment of a sprayer subsystem 16 incorporating direct injection spraying apparatus is shown in FIG. 4. In one embodiment, the direct injection spraying apparatus is an addition to the basic sprayer subsystem. An example of the installation of direct injection spraying equipment to the system of FIG. 2(a) is shown in FIG. 4. Injection console 100 and pump pack 102 are connected through bus 22 to the remainder of system 10. Injection console 100 includes an injection user interface 110 for receiving user commands directed towards control of the direct injection subsystem. In one embodiment, plumbing tee 40 of FIG. 2(a) is replaced by injection port tee 108. Injection port tee 108 is capable of accepting up to four injection inputs. In the embodiment shown, an injection pump 104 controlled by pump pack 102 injects material drawn from container 106 through one of the injection ports of tee 108.

Three types of injections are possible with an injection system as shown in FIG. 4. In carrier-based injection, subsystem 16 is controlled to keep the ratio of product to carrier constant. The user is then burdened with the requirement that he or she maintain speed within a relatively narrow range in order to maintain adequate boom nozzle pressure.

Another type of injection is area based injection. In an area based injection system, subsystem 16 is controlled to maintain a certain application rate. A third type of injection is a hybrid of the previous two types. In this type of injection the user can set up in area-based injection, set up the range of acceptable pressure and accept the transport lag. Thus can cause variation in the spray pattern generated by the boom sprayers.

Figure 16:
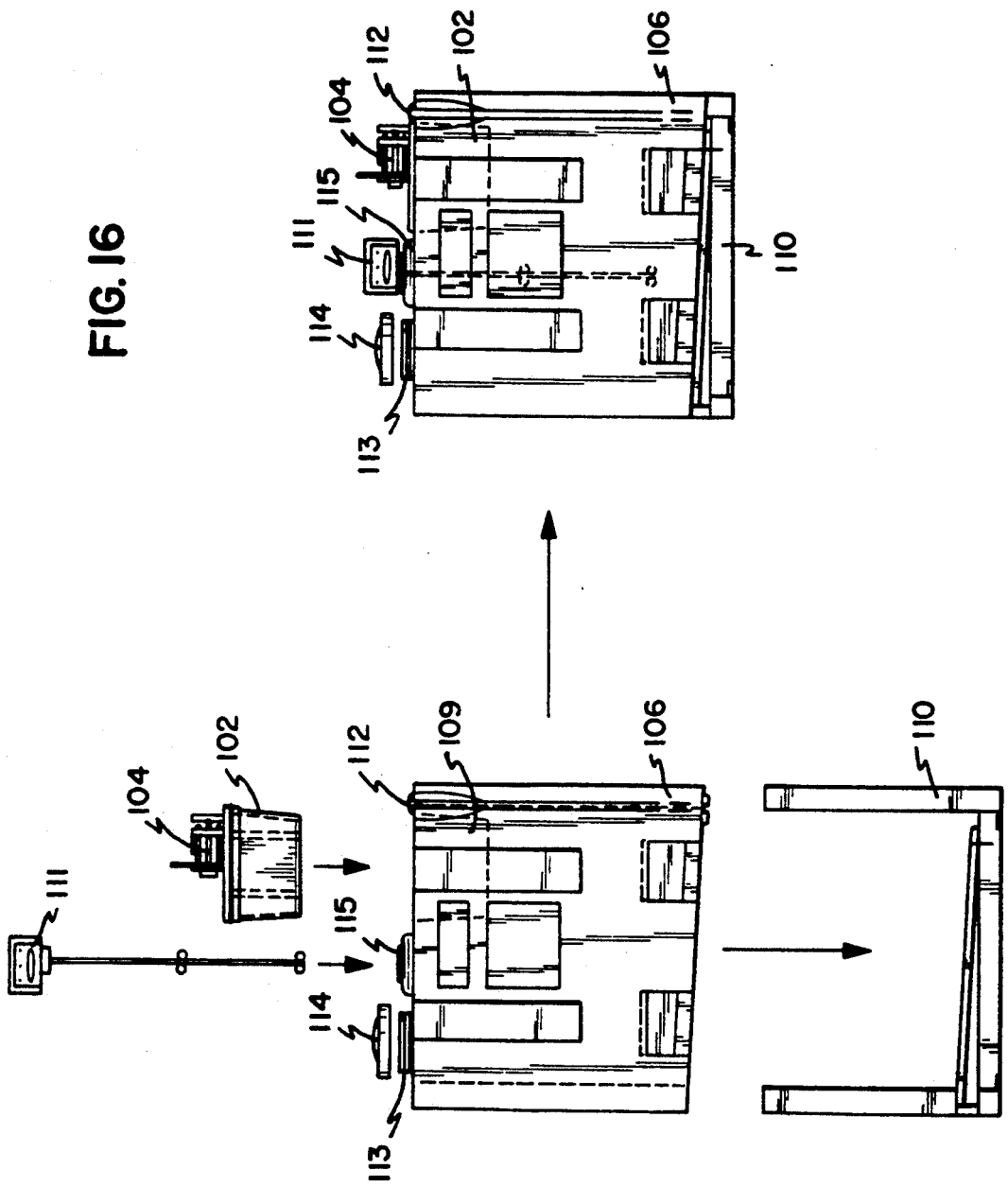
FIG. 16 is a mechanical drawing of the container, injection pump and pump pack used in one embodiment of the present invention.

A container 106, injection pump 104 and a pump pack 102 are illustrated in greater detail in FIG. 16. In this embodiment, container 106 is a 30-gallon capacity vessel with a fill well 113 for pouring chemicals into container 106, a lid 114 for capping fill well 113, an agitation system port 115, a suction port 112 and a pump well 109. Pump well 109 is a cavity designed into container 109 such that a pump pack 102 can be placed into the cavity.

FIG. 16 also shows a tank base 110 which is generally attached to the direct injection spraying apparatus. Tank base 110 permits the user to easily swap containers 109. An optional agitation system 111 which can be used to agitate the contents of container 106 is also shown.

An expanded view of pump pack 102 and pump 104 is shown in FIG. 17. Pump pack 102 consists of an enclosure 117 for accepting a pump pack controller printed circuit board, a lid 118 and a handle 116. Injection pump 104 is mounted directly into lid 118 such that the pump pack controller can monitor and control pump 104. Pump pack 102 also includes a capacitive card reader 228 for use in identifying the chemical contained within container 106.

In one embodiment, pump 104 is a Hypro Series 8600 twin plunger pump manufactured by Hypro, New Brighton, Minn. The Hypro Series 8600 pump is a 2-piston pump. This pump was found to be the best pump for obtaining a wide range of output which remained linear in performance. The design of the pump is such that the system can be automatically shifted between single piston and double piston performance according to how much chemical injection is required.

This is accomplished by connecting the hose drawing material from container 106 to one input port of pump 104, connecting one of the outputs of pump 104 through a three-way valve to the second input port of pump 104 and combining the other outport of the three-way valve with the second output. The dual pistons of pump 104 pump out of phase to reduce pulsing at the injection port.

Current is controlled to pump 104. A pulse width modulated drive current is provided and is controlled by pump pack 102. This permits the system to ramp up the motor of pump 104 with the least system load.

Spraying subsystem 16 can also be configured as an anhydrous ammonia spraying system (not shown). In an anhydrous spraying system, servo valve 56 is placed in series with flowmeter 58 in order to restrict the flow of anhydrous ammonia to the applicator. Sprayer console 30 must then be informed of this change in the default configuration during calibration through the selection of in-line mode rather than bypass mode.

In an alternate embodiment of an anhydrous application system, sprayer accessory module 32 is replaced with an anhydrous ammonia accessory module. Temperature and pressure sensors are mounted to flowmeter 58 and connected to the anhydrous ammonia accessory module in order to monitor for anhydrous material in liquid-to-vapor transition. This allows spraying subsystem 16 to alert the user that application of the anhydrous ammonia material is not proceeding as planned.

Figure 5:
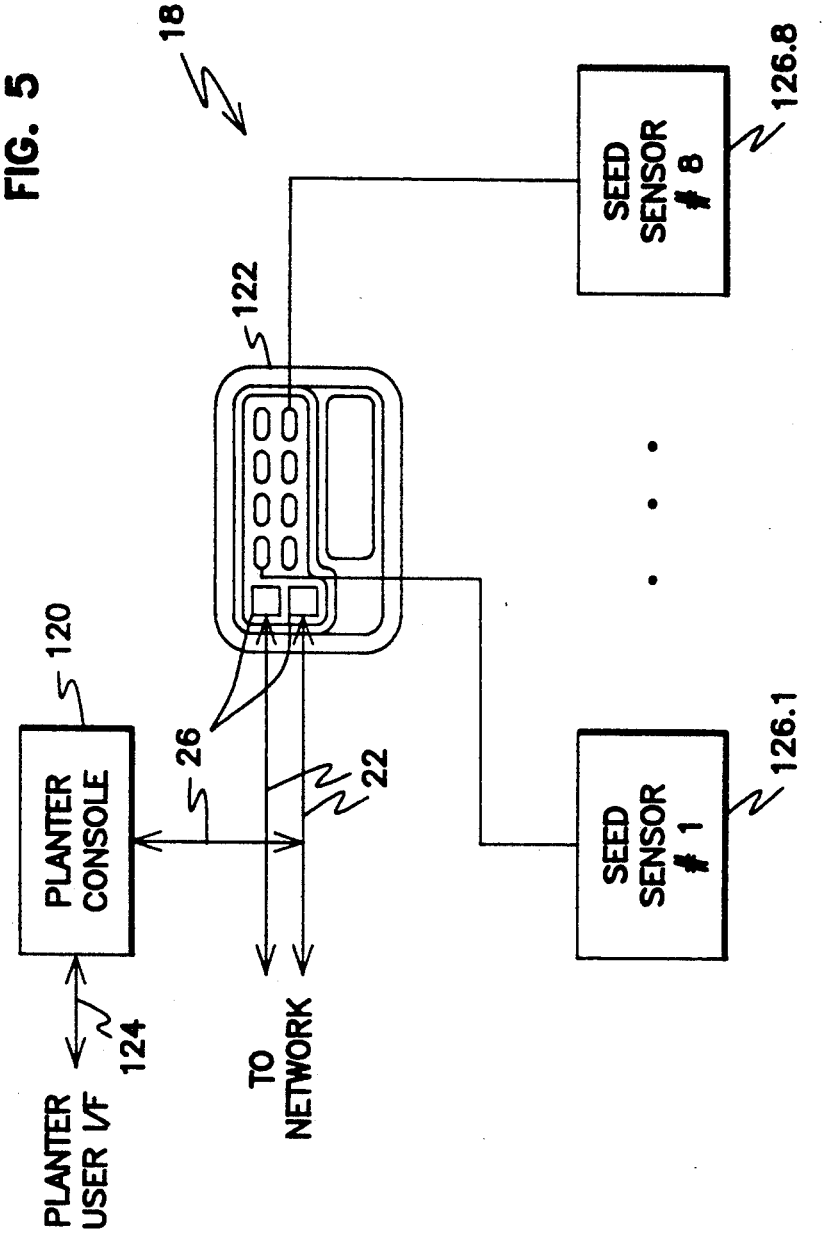
FIG. 5 is an electrical block diagram representative of a planter subsystem according to the present invention.

FIG. 5 illustrates a planter subsystem 18 in accordance with the present invention. A planter console 120 and a row unit accessory module 122 are connected through bus 22 to the remainder of system 10. Planter console 120 includes a planter user interface 124 for accepting user instructions for operation of the planter subsystem. Row unit access module 122 contains inputs for accepting electrical connections from seed sensors 126.1 through 126.n. In one embodiment a module 122 is capable of monitoring up to eight seed sensors 126. Row units access module 122 monitors each passage of a seed or clump of seeds as an event and notes it in memory. A number representing the number of events in a time period is forwarded periodically to planter console 120.

In an alternate embodiment, planter subsystem 18 could further include seed feeder mechanism control (not shown) for controlling the movement of seeds through seed feeders in planter subsystem 18. These controls would then be electrically connected to row unit access module 122. This would allow module 122 to modify operation of the seed feeder by using the control to regulate the flow of seeds in conjunction with data on the flow of seeds sensed through seed sensor 126.

Figure 6:
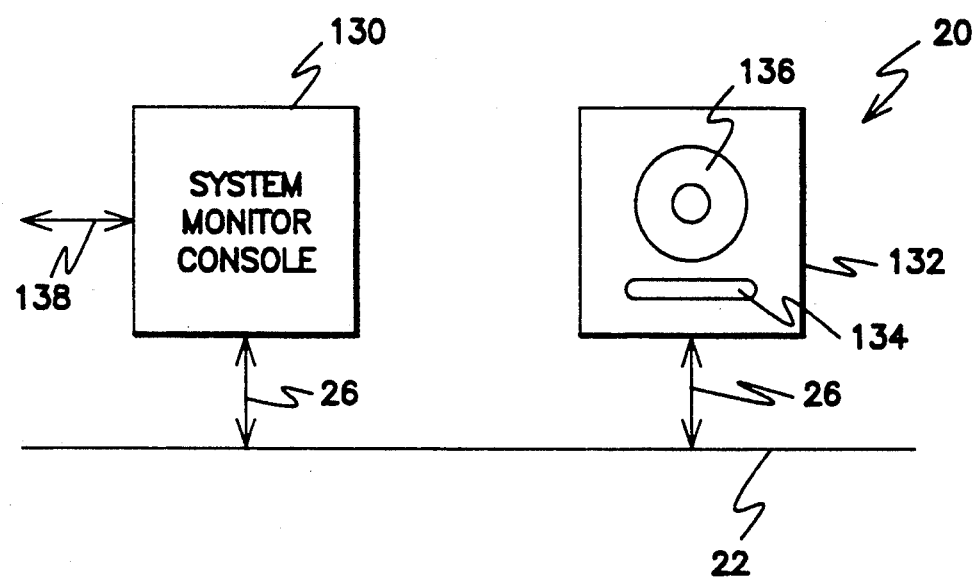
FIG. 6 is an electrical block diagram of a monitor subsystem according to the present invention.

A monitor subsystem 20 is illustrated generally in FIG. 6. A monitor console 130 and an input/output accessory module 132 are connected through bus 22 to the remainder of system 10. Monitor console 130 includes monitor user interface 138 for displaying status corresponding to monitor subsystem operation. Input/output accessory module 132 includes a memory card reader 134, a real-time clock 135 and a voice synthesizer 136 which operate in conjunction with monitor console 130. Accessory module 132 is used in concert with the system monitor console to record spray applications for later archive and playback. In one embodiment, the memory card reader accepts PCMCIA/JEIDA compatible 68-pin random access memory cards. The preferred type of card is one that uses battery backup random access memory and provides a battery indicator that indicates when the battery is reaching the end of its useful life.

In an alternate embodiment, a flash EPROM memory card such as that manufactured by Fujitsu Microelectronics, Inc., Integrated Circuits Division, San Jose, Calif., can be used.

In one embodiment of monitor subsystem 20, monitor user interface 138 includes display for displaying the area sprayed by subsystem 16. Boom monitoring records the status of boom solenoid valves 60 in order to determine if a particular swath of land was covered by sprayer subsystem 16.

It is anticipated that the software upgrades will be handled either through a memory card inserted into card reader 134 or by way of a serial link which would use card reader 134 as a serial port into system 10. Either method would permit the design of a day's planting and spraying activities at home on a personal computer. Data corresponding to that design could then be downloaded to system 10 through card reader 134.

It is further anticipated that voice synthesizer 136 will use compressed voice data stored in either local nonvolatile memory or on the memory card to alert the vehicle operator, via spoken messages, as to error or warning conditions. Voice synthesizer 136 could also be used to help guide new users through the operation of system 10. Compressed voice data will be expanded by a processor in the input/output accessory module.

In one embodiment, consoles 14, 30, 100, 120 and 130 are kept in the cab of the vehicle for easy access by the vehicle operation. Each console is housed in a weatherproof housing having an LCD display and two or more switches for user data entry. In addition, two connectors are provided for daisy-chaining one console to the next.

Figure 12:
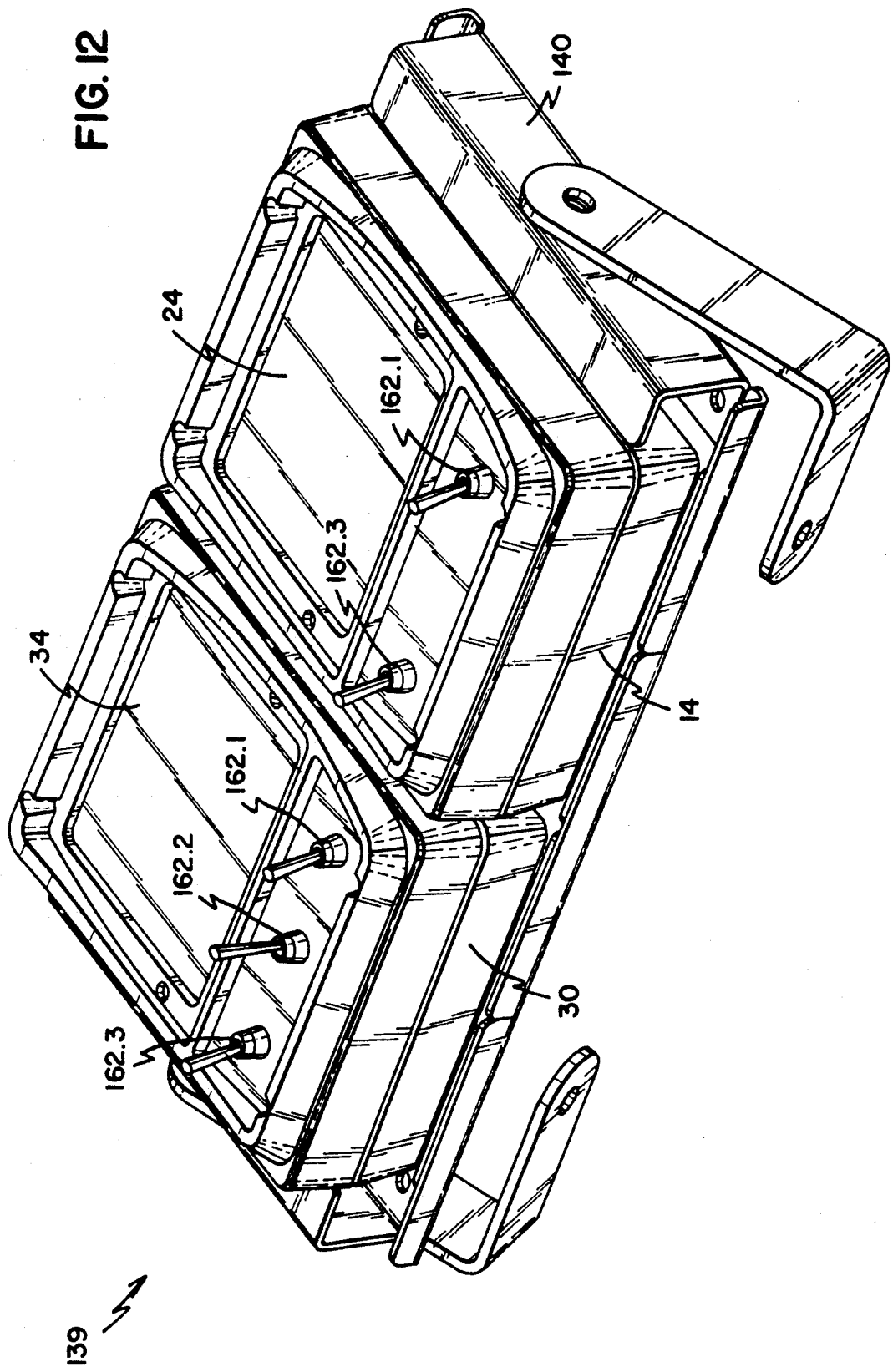
FIG. 12 is a mechanical drawing of the base and sprayer subsystem consoles according to the present invention.

A mechanical drawing representative of the enclosures of a base console 14 and a subsystem console 30, 100, 120 or 130 is illustrated generally in FIG. 12. FIG. 12 shows a representative display console group 139 formed by inserting a base console 14 and a sprayer console 30 into console support 140. Console support 140 is wired to accept consoles having standard media interface 26 (not shown). It should be available in a variety of widths to accommodate a range of console combinations.

In one embodiment, connectors on support 140 are arranged to make contact to a console's media interface 26 when that console is pressed into support 140. Each console is manufactured with one or more VELCRO pads attached to the back of the console. Pressing a console into support 140 causes VELCRO pads on support 140 to come in contact with the pads on the console, securing the console to the support.

System Controllers

Figure 7:
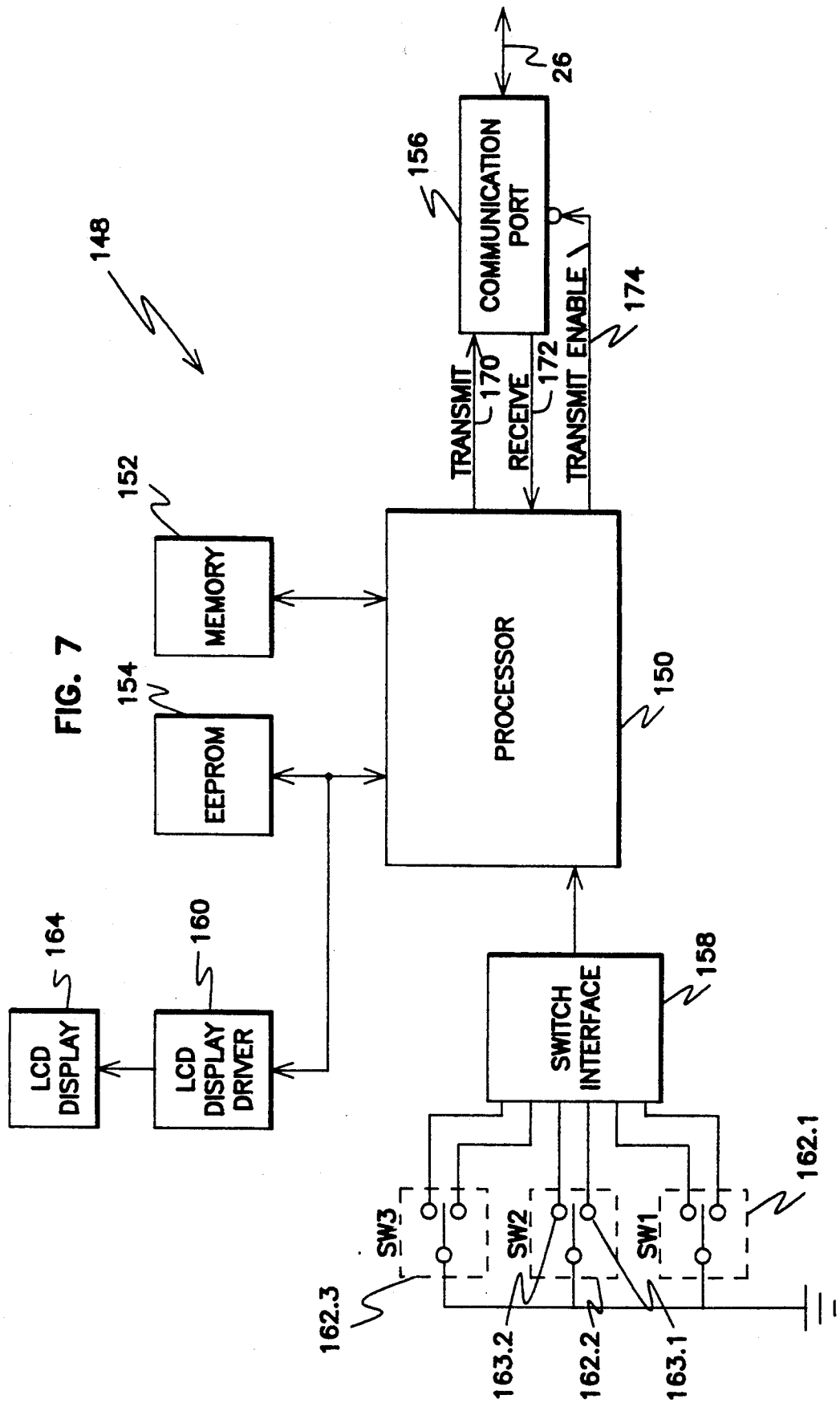
FIG. 7 is an electrical block diagram of a console controller according to the present invention.

Each console operates independently under the control of an embedded microcontroller: One embodiment of a console controller used in the present invention will be described next. An electrical block diagram of the console controller used by base console 14, sprayer console 30, injection console 100, planter console 120 and monitor console 130 is shown in FIG. 7. FIG. 7 shows a processor 150 connected to a memory 152, an EEPROM 154, a communication port circuit 156, a switch interface 158 and an LCD driver 160. Switch interface 158 is connected in turn to up to three user entry switches 162.1 through 162.3. In one embodiment of base console 14, switch 162.2 is removed and switch interface lines 163.1 and 163.2 are connected to run.-/hold sensor input 90 and speed sensor input 92, respectively. LCD display driver 160 is connected in turn to LCD display 164.

Communication port circuit 156 is the console interface to bus 22. FIG. 7 shows a transmit line 170, a receive line 172 and a transmit enable line 174 for controlling communication on media interface 26.

In one embodiment, processor 150 is a microcontroller from the Intel 8051 family of microcontrollers. Processor 150 is connected through ports 0 and 2 to memory 152 and through two serial lines emulating an I$^2$C bus to EEPROM 154 and LCD driver 160. The two serial lines are assigned to two pins of port 1. Information on the I$^2$C bus can be found in Section 3 of the *Linear Data Manual, Vol. II, Industrial*, published in 1988 by Signetics.

Program code and data used in operation of the console and its associated modules are stored in memory 52. LCD display 164 and switches 162 combine to form a user interface capable of displaying status and control information associated with sensor and implements in its associated subsystem.

In one embodiment of the consoles used in system 10, LCD display 164 and LCD display driver 160 are designed specifically for each console. Representative console displays 164 are illustrated generally in FIGS. 15(a)-(d).

Figure 15A:
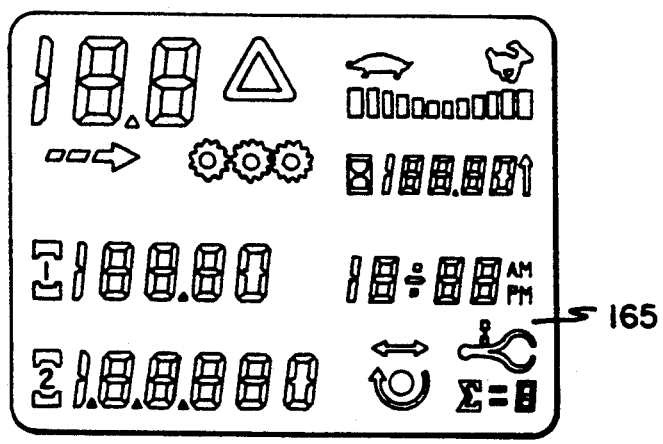
FIG. 15(a) shows a base console LCD display 165 useful in displaying status for base console 14.

FIG. 15(a) shows a base console LCD display 165 useful in displaying status for base console 14.

Figure 15B:
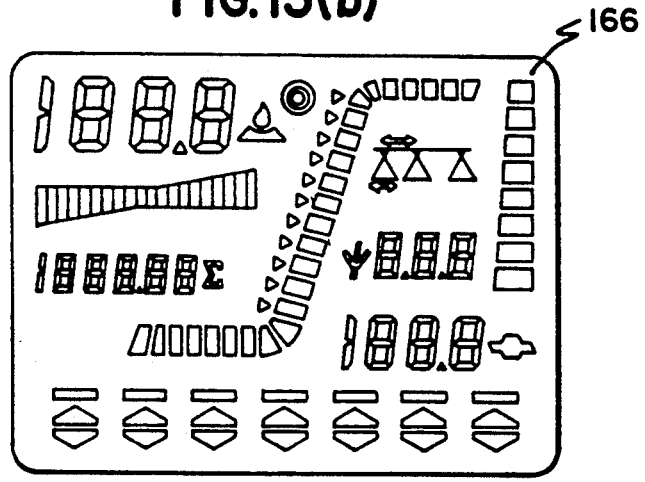
FIG. 15(b) shows a sprayer console LCD display 166 useful in displaying status for sprayer console 30.

FIG. 15(b) shows a sprayer console LCD display 166 useful in displaying status for sprayer console 30.

Figure 15C:
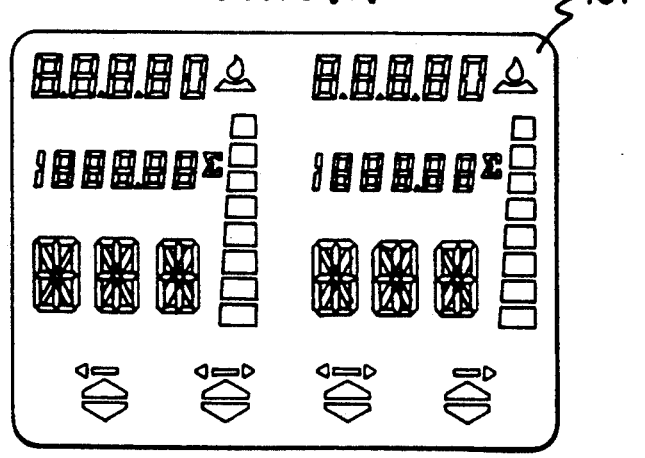
FIG. 15(c) shows an injection console LCD display 167 useful in displaying status for injection console 100.

FIG. 15(c) shows an injection console LCD display 167 useful in displaying status for injection console 100.

Figure 15D:
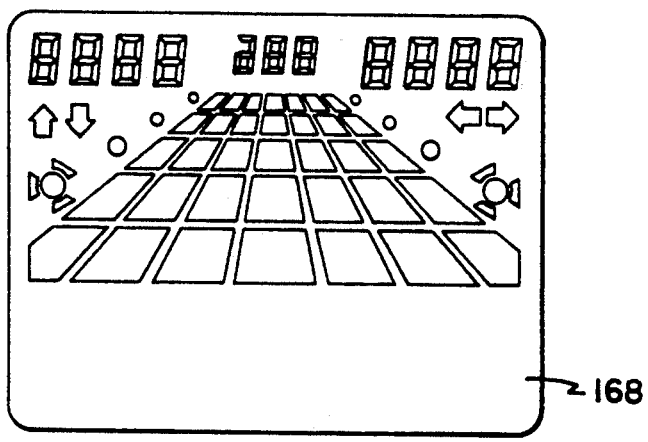
FIG. 15(d) shows a monitor console LCD display 168 useful in displaying status for monitor console 130.

FIG. 15(d) shows a monitor console LCD display 168 useful in displaying status for monitor console 130.

The information conveyed in FIGS. 15(a)-(d) is described in more detail in the attached appendix.

In an alternate embodiment, console displays 165 through 168 could be implemented with a dot matrix LCD display and driver. Dot matrix displays would offer greater flexibility on the design and modification of screen displays but would suffer a decrease in viewing angle when compared to the dedicated LCD displays above. A dot matrix LCD display would, however, have the added benefit of permitting the design of a generic, programmable console which could be programmed through memory card reader 134 into any of the consoles 14, 30, 100, 120 or 130.

Figure 8:
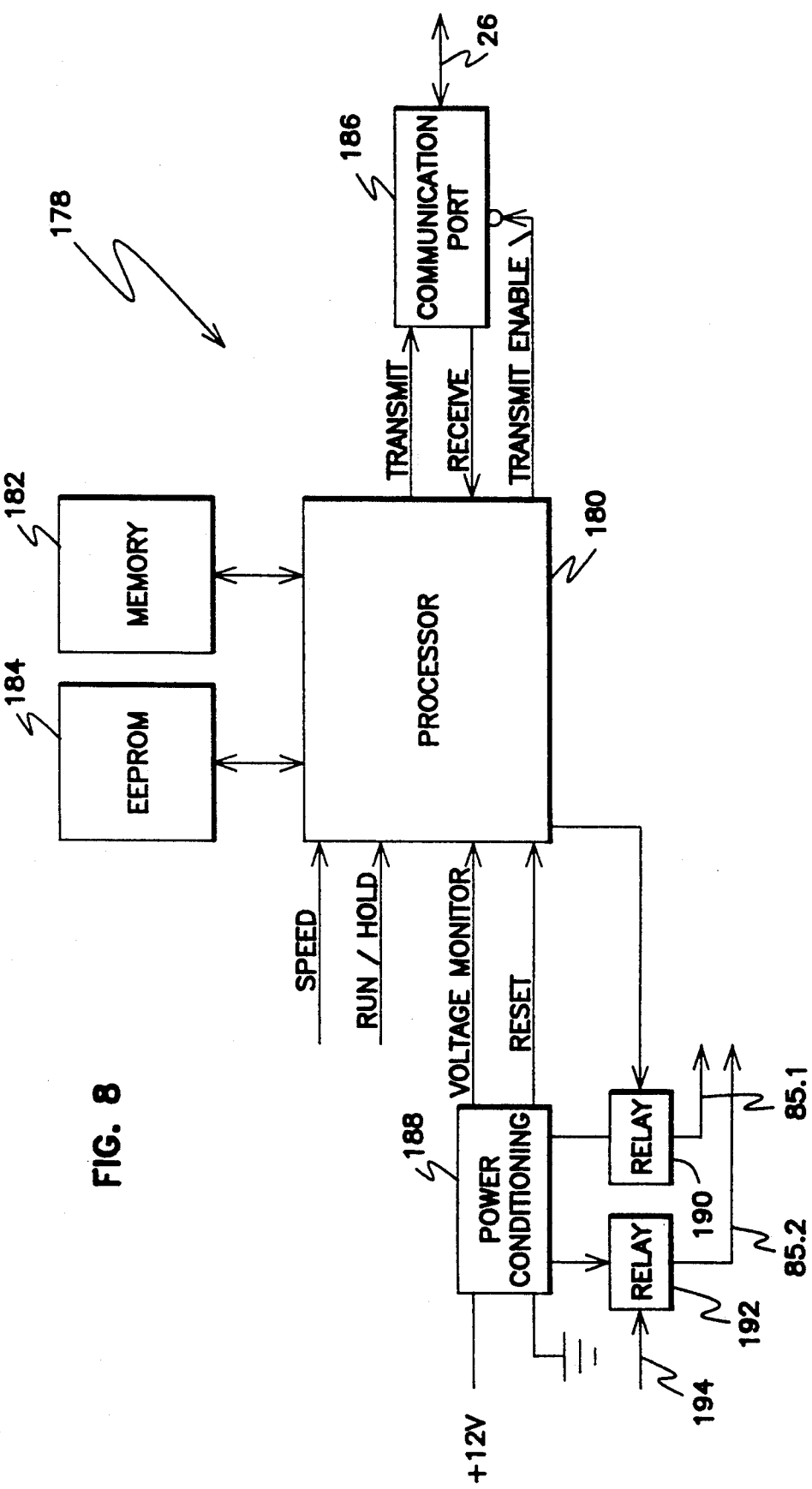
FIG. 8 is an electrical block diagram of a bus master according to the present invention.

One embodiment of bus master 12 is illustrated generally in an electrical block diagram as shown in FIG. 8. A processor 180 is connected to a memory 182, an EEPROM 184, a communication port circuit 186, a power conditioning circuit 188 and relays 190 and 192. Power conditioning circuit 188 uses surge control circuitry well known in the art to clip over-voltages generated by the vehicle electrical system. In one embodiment of the present invention, system power is provided to base console 14 and each of the subsystems through relays 190 and 192. As described in connection with FIG. 3, power and ground taken from the outputs of relays 190 and 192 are included within the cable 85 used to daisy chain bus 22 to each console and accessory module. In one embodiment, relay 190 (connected to 85.1 in FIG. 3) provides power to each of the consoles. Relay 192 (connected to 85.2 in FIG. 3) operating in conjunction with switch 86 provides power to the accessory modules and to the remainder of the subsystems. Relay 192 can be shut off by either processor 180 or by switch 86 through line 194.

Figure 9:
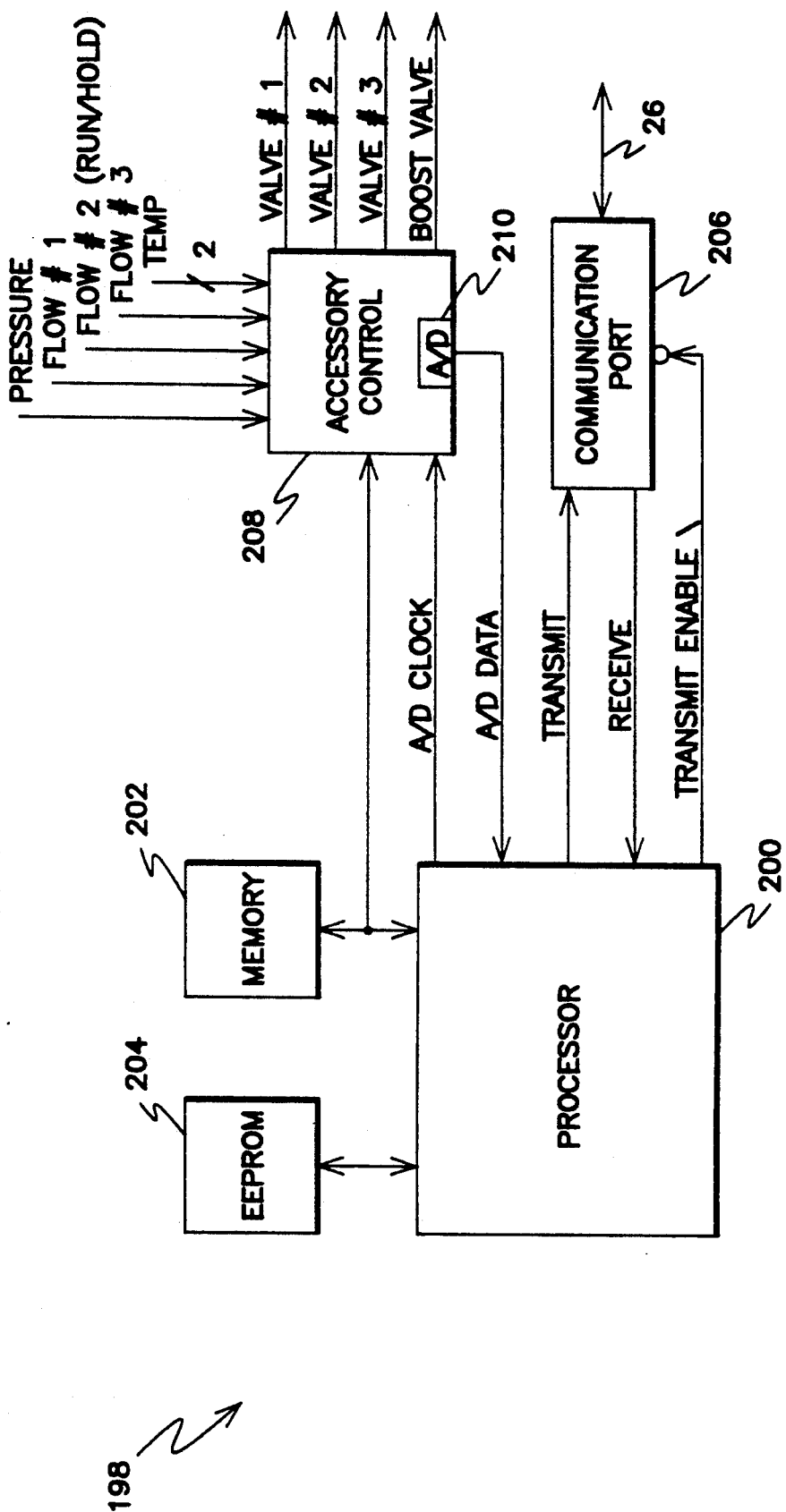
FIG. 9 is an electrical block diagram of an accessory module controller according to the present invention.

An electrical block diagram of an accessory module such as sprayer module 32 or boom extension module 33 is shown generally in FIG. 9. Processor 200 is connected to memory 202, EEPROM 204, communication port circuit 206 and accessory control circuit 208. Accessory control circuit 208 serves as the interface to the electromechanical switches and valves of each of the subsystems and to the sensors unique to the subsystems. Analog/digital conversion device 210 converts analog signals fed back from each of the sensors into digital data supplied to processor 200.

Figure 10:
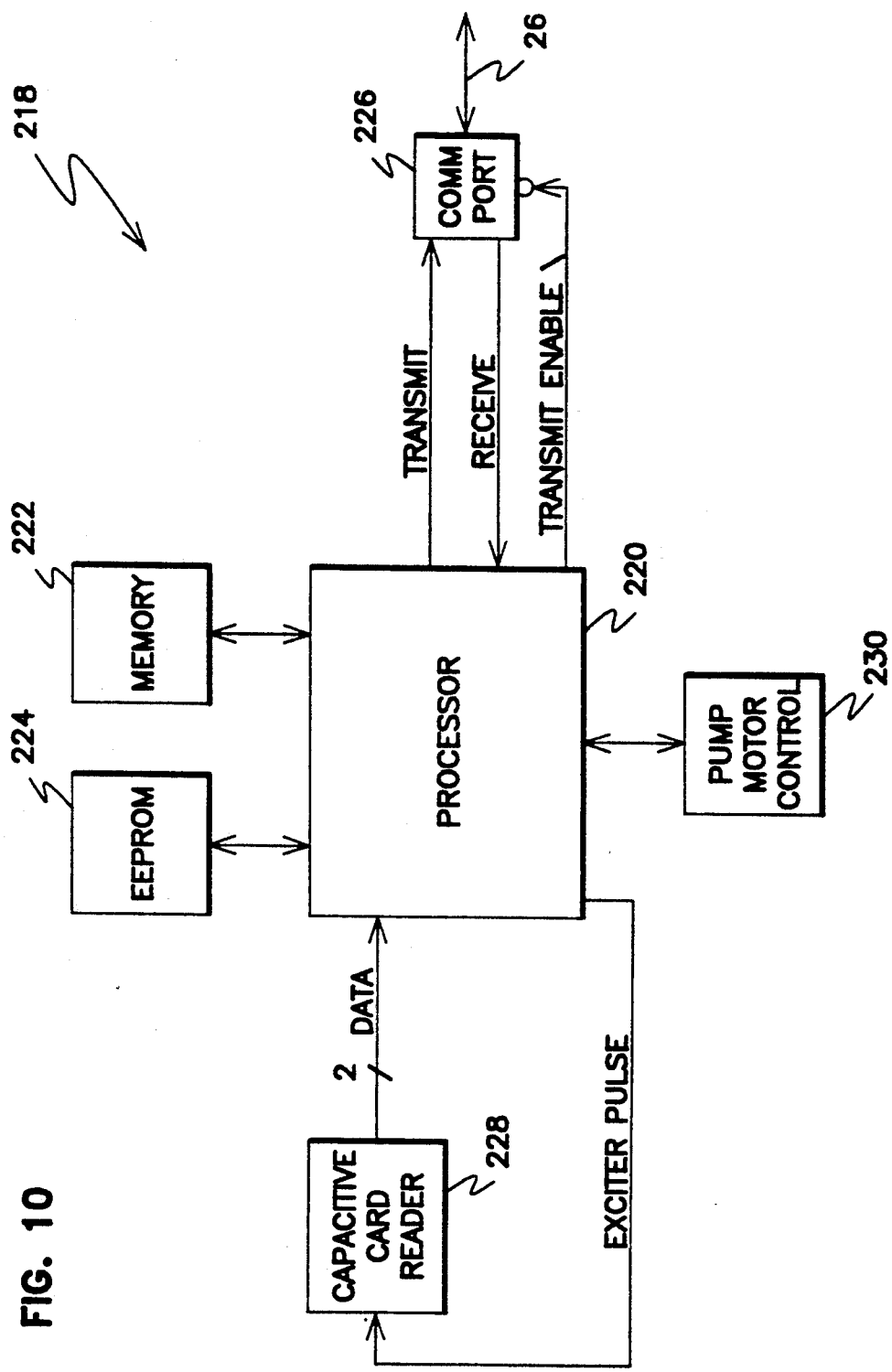
FIG. 10 is an electrical block diagram of a pump pack controller according to the present invention.

An electrical block diagram of the controller used in pump pack accessory module 102 is shown generally in FIG. 10. Processor 220 is connected to memory 222, EEPROM 224, communication port circuit 226, pump motor control 230 and capacitive card reader 228. In one embodiment, control 230 measures rotation of a shaft rotating six times for each cycle of injection pump 104. In a manner known in the art, rotation of the shaft is measured by interrupting light falling on a photosensor. In one embodiment, light is interrupted 25 times for each revolution of the shaft. Pump motor control 230 processes the pulses received from the light sensor and presents them to processor 220. Processor 220 uses the frequency of the light pulses to determine the pump rate of injection pump 104.

Figure 18:
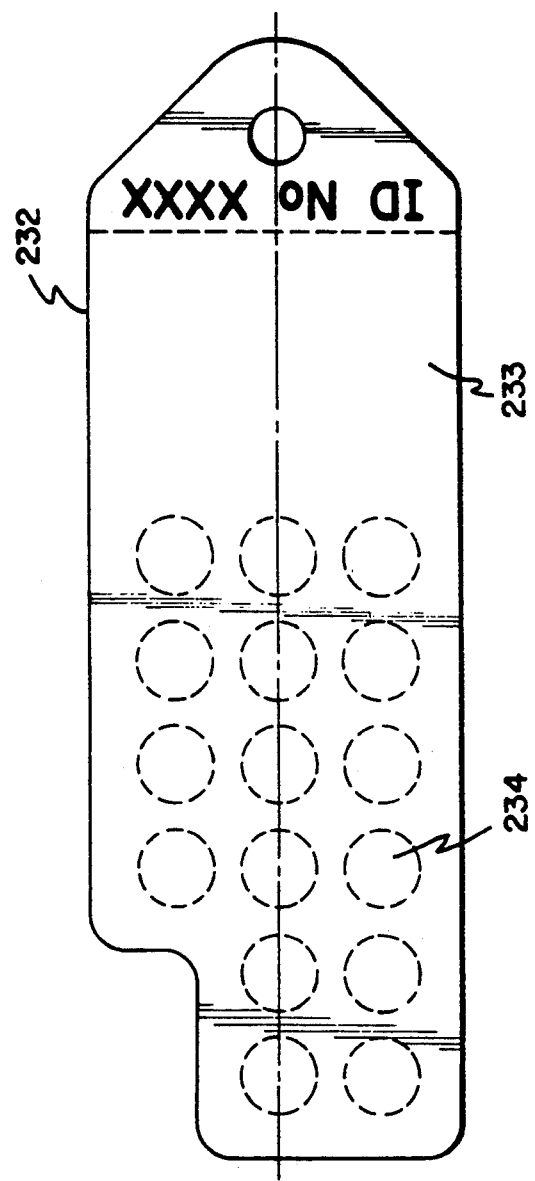
FIG. 18 is a drawing representative of a carbon screened card used in a capacitive card reader according to the present invention.

In the same embodiment, capacitive card reader 228 including as plurality of capacitive reader elements is built directly into the printed circuit board containing pump pack controller 218. A ground plane (not shown) is fixed parallel to the capacitive card reader elements arrayed on the printed circuit board. The ground plane provides support for a carbon coated card 232 placed between the ground plane and the array of card reader elements and illustrated in FIG. 18. Card 232 is a mylar card with a layer of carbon film screened thereon. The screening creates one or more circular areas 234 void of carbon film. The pattern of voids 234 is indicative of the chemical in container 106. Card 232 is coated with a thin film of polyester for protection.

In operation, an exciter pulse generated by processor 220 causes a voltage potential to appear across the inserted card 232. The voltage appearing at each of the reader elements indicates whether the card is void of carbon in the vicinity of the element. The pattern of voids 234 on card 232 is then used to identify the chemical pump pack 102 will be controlling.

Card 232 is intended to be part of a comprehensive label management system. Each formulation of chemical in the direct injection spraying system will be identified with a unique identification code. The code will be carbon screened on a card 232 associated with that chemical formulation. In addition, the code will be silk-screened onto the same card 232 in order to provide a visual check to the user.

Software resident in system 10 will be capable of reading the code on card 232 and modifying the application rate accordingly. Parameters such as application rate, allowable tank mixes, specific pump performance characteristics, specific calibration sequences, calibration values, etc., can be pre-stored in system 10 and accessed as a function of the code on card 232. In such a system, expiration dates would be assigned to the label parameters to keep the system current. In addition, the identity of the chemical as read from card 232 could be used to modify the performance of injection pump 104 to optimize pumping of that particular chemical.

Figure 11:
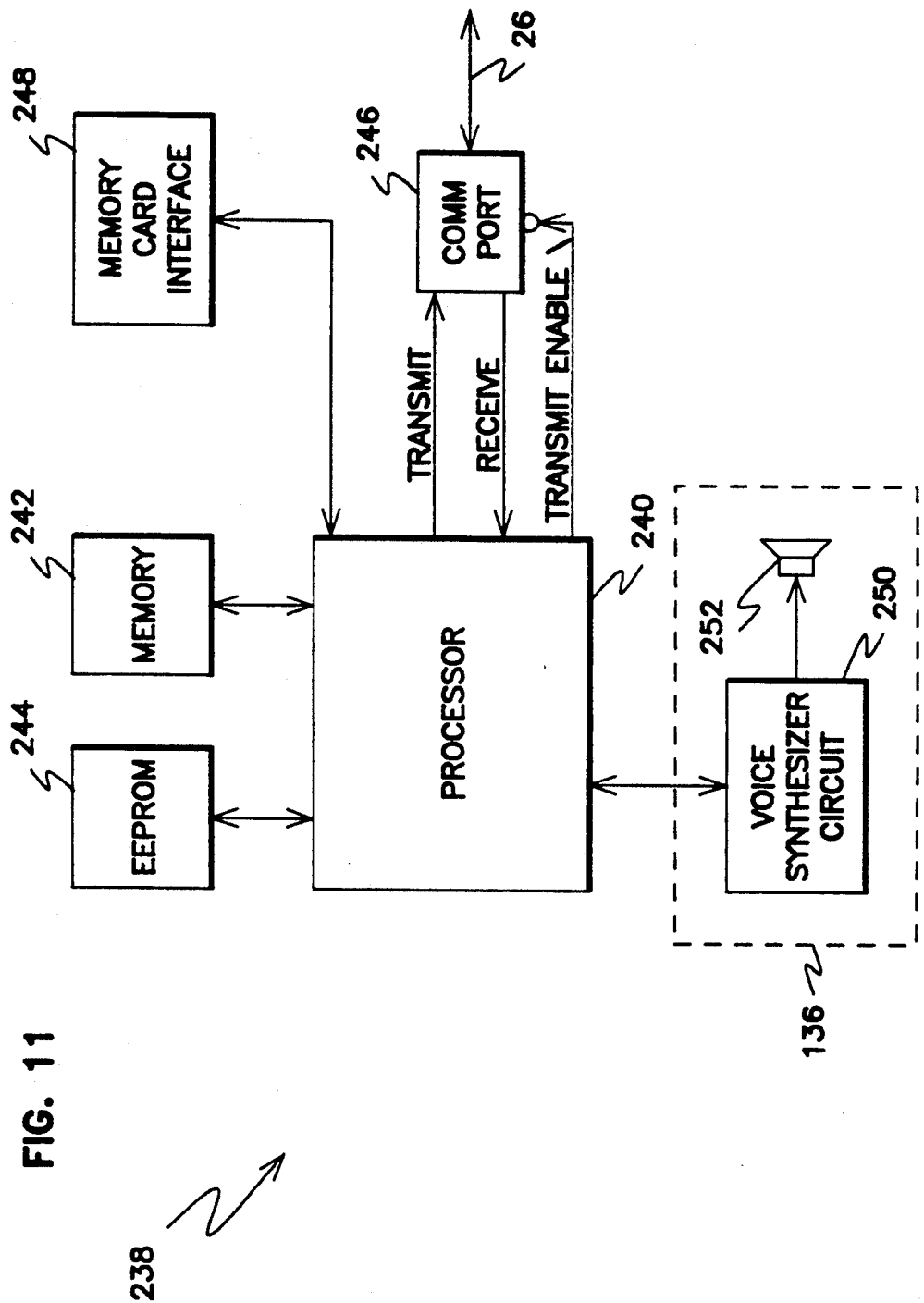
FIG. 11 is an electrical block diagram of the input/output accessory controller according to the present invention.

An electrical block diagram of the controller for input/output accessory module 132 is shown generally in FIG. 11. A processor 240 is connected to a memory 242, an EEPROM 244, a communication port circuit 246, a memory card interface 248 and a voice synthesizer circuit 250. Memory card interface 248 accepts PCMCIA/JEIDA compliant 68-pin memory cards. Voice synthesizer circuit 250 provides the stimulus for speaker 252 mounted in the accessory module enclosure (not shown).

System Communication

Controllers operating within system 10 are capable of communicating with all other processors in the system. This permits free sharing of information from common sensors such as speed and run/hold.

In one embodiment, system 10 uses a half-duplex serial differential line as a serial bus and assigns specific time slots on the bus for controllers to write to and read from the bus. The microcontroller used in one embodiment of system 10 is chosen from the Intel 8051 family of microcontrollers. This family of microcontrollers has a UART capability which permits the construction of a cost effective serial bus. Operation of the Intel 8051 microcontroller is described in the 1991 edition of 8-*Bit Embedded Controllers* available from Intel Corporation, which publication is hereby incorporated by reference. In a preferred embodiment of system 10, the 80C32 is used for the console controllers 148 and the 80C31 is used for pump pack controller 218. The choice of the 80C31 or 80C32 for a specific controller is a design decision which will depend on the controller application.

In one embodiment, the serial bus uses 16 gauge twisted-pair wire to connect controller to controller in a daisy-chain fashion. Each component to be connected to bus 22 is equipped with an upstream and a downstream connector. Controllers with no downstream connector must be terminated with a 62 ohm termination resistor placed between each side of the differential line and ground. In one embodiment, this termination is performed by forming a termination plug connecting a first 62 ohm resistor between the true side of the differential line and ground and a second 62 ohm resistor between the complement side of the differential line and ground. This plug is then plugged into the downstream connector, effectively terminating the differential line. In an alternate embodiment, this termination could be permanently mounted into a controller which would, by necessity, have to be the last controller on the chain.

Although one embodiment of bus 22 is a half-duplex serial bus, it should be obvious to one skilled in the art that other methods of communication could advantageously be used to achieve intercommunication between independent controllers.

Figure 13:
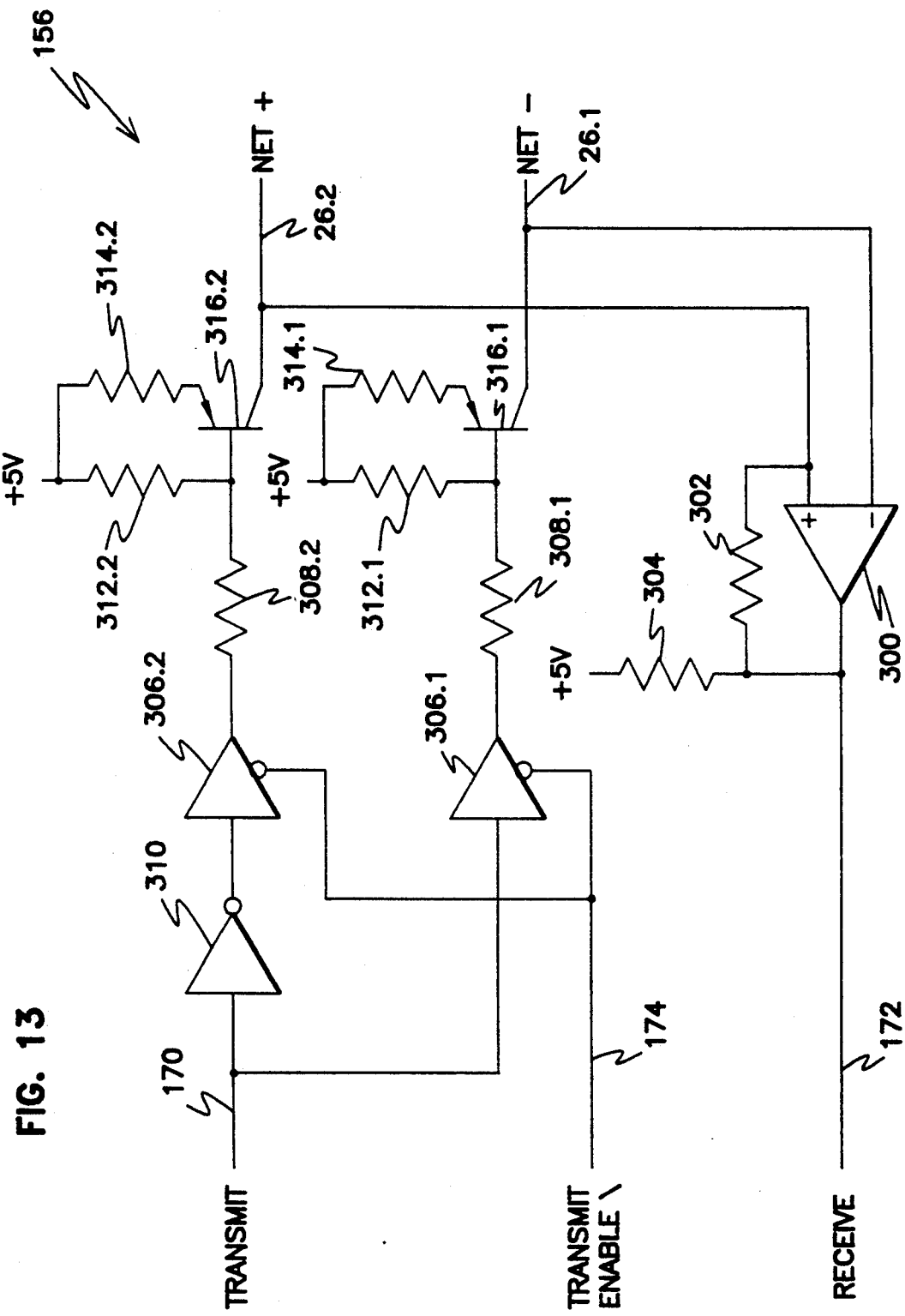
FIG. 13 is an electrical circuit diagram of the communication port according to the present invention.

One embodiment of a communication port circuit useful in serial bus communication is illustrated in an electrical schematic in FIG. 13. The operation of this device will be described in relation to the controller illustrated in FIG. 7 but it should be apparent that the circuit can be used in any controller including the controllers illustrated in FIGS. 8–12.

Transmit line 170 from processor 150 provides the serial data to be transmitted via media interface line 176 to bus 22. Receive line 172 transmits the serial data received from bus 22 to processor 150. Since one embodiment of bus 22 is a serial bus, care must be taken to isolate controllers from the bus when they are not transmitting. Transmit enable line 174 is a low active signal from processor 150 which serves to place the transmit side of communication port circuit 156 in a high impedance state when processor 150 is not transmitting.

In the embodiment shown in FIG. 13, drivers and receivers emulate the operation of industry standard 75107 and 75109 parts. Data is transmitted by unbalancing one side of the balanced line system with a 10 mA current source. To receive data, signals transmitted through differential media interface lines 26.1 and 26.2 are converted to digital levels by amplifier 300, resistor 302 and resistor 304 in a manner known in the art. In one embodiment, amplifier 300 is an industry standard 2901 amplifier, resistor 302 is a 374 k ohm resistor and resistor 304 is a 3 k ohm resistor which acts to pull up the output of amplifier 300.

Data to be transmitted from processor 150 must be first converted to a differential signal. A true and complement version of the data present on transmit line 170 is presented to tri-state buffers 306.1 and 306.2, respectively, by connecting line 170 directly to the input of buffer 306.1 and through an invertor 310 to the input of buffer 306.2. Each buffer 306 is connected through a resistor 308 to the base of a bipolar transistor 316. The base and emitter of transistor 316 are connected to +5 volts through resistors 312 and 314, respectively, while the collector is connected to bus 22 through differential media interface line 26 as shown in FIG. 13.

The outputs of tri-state buffers 306 and 308 present a high impedance output when disabled. However, when transmit enable line 174 is in a LOW logic state, buffers 306 and 308 begin to drive output signals corresponding to the logic levels existing on their inputs. A logic HIGH sourced by one of the buffers 306 will cause its corresponding transistor 316 to conduct, unbalancing the differential line with a 10 mA current source. In one embodiment, tri-state buffers 306 are 74HC125 logic devices and invertor 310 is a 74HC02 with one input grounded. Both are available from Texas Instruments, Dallas, Tex. Resistors 308 and 312 are 2.2 K ohm resistors and resistor 314 is a 180 ohm resistor.

Figure 14:
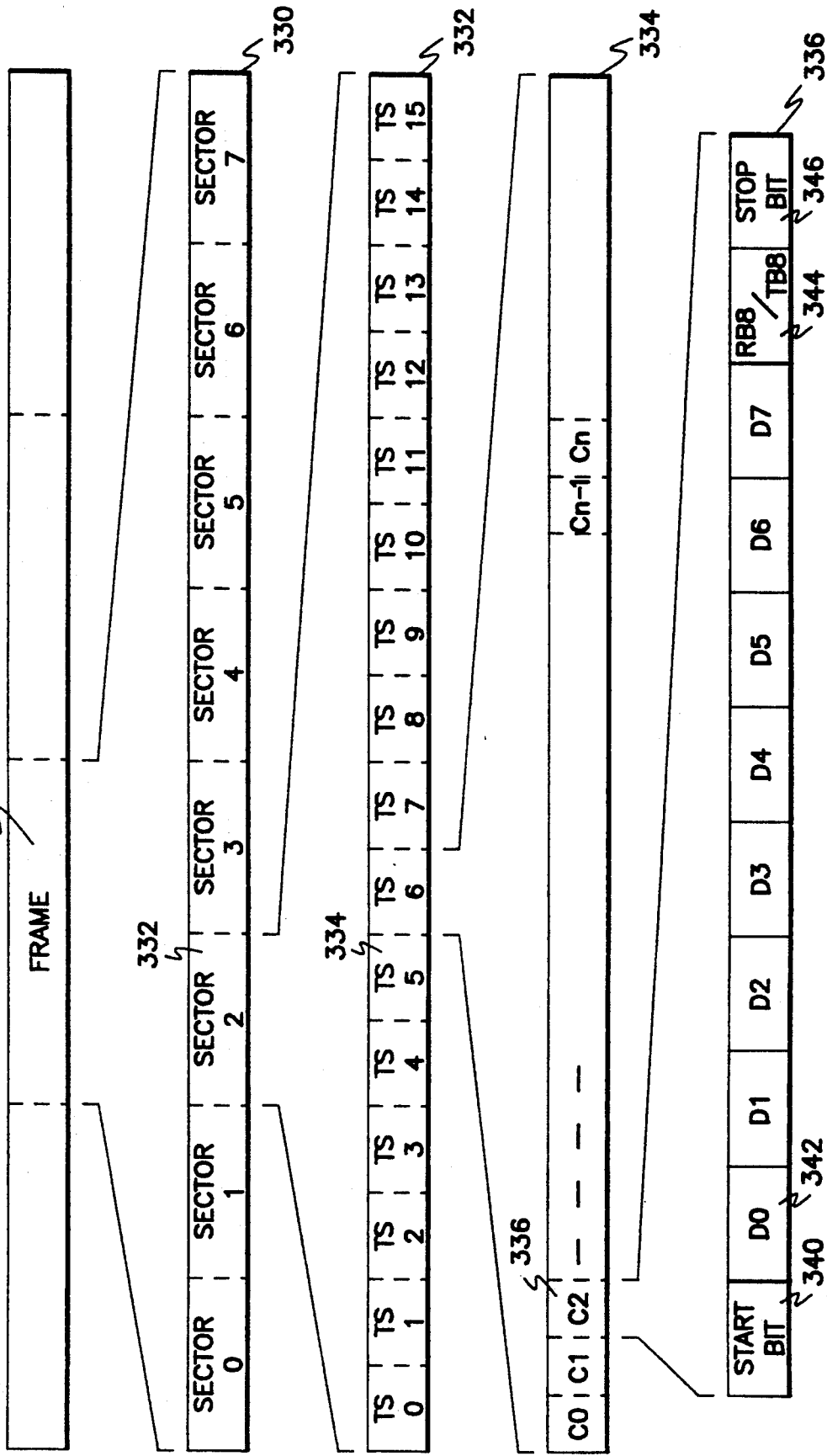
FIG. 14 is a timing diagram illustrative of the periodic nature of communications within the present invention.

Communication in system 10 is illustrated generally with the timing diagram shown in FIG. 14. Communication on medium 14 is periodic with the coarsest unit of time being a frame 330. In one embodiment, a frame 330 is 256 ms in length. Each frame 330 is divided into 8 sectors 332 of 32 ms each and each sector 332 is divided into sixteen time slices 334 of 2 milliseconds each.

Time slices 334 are the lowest level of synchronous communication. Within each time slice one or more system controllers may access bus 22 to read or write a character 336 of data. In one embodiment, an Intel 8051 family microcontroller operating in serial communications Mode 2 generates a character 336 of eleven bits for each byte of data to be transferred. The first bit is a Start bit 340. This is followed by the byte 342 to be transferred (LSB first), by programmable data bit 344 and a Stop bit 346.

Programmable data bit 344 is used by system 10 as a synchronizing bit. At the start of each time slice 334 bus master 12 sets bit 344 in the first character 336 placed on bus 22. Only bus master 12 can set data bit 344. Controllers that receive a character 336 with bit 344 set know that this is the first character of a new time slice. In one embodiment, the byte accompanying the first character sent will contain the time slice number. The second character will contain the sector and system mode. This is a mechanism for recovery if characters get trashed on bus 22 due to collisions or other problems.

Bit 344 serves another useful function in a communications system according to the present invention. Microcontrollers from the 8051 family can be programmed to receive a serial port interrupt only if data bit 344 is set. Therefore, if a controller knows that it is not responsible for reading or writing any of the remaining characters to be transmitted in a time slice, it can set a bit (SM2) so that it will not be interrupted unless a new sync byte is sent. This eliminates a source of frequent interrupts and frees the controller to perform other tasks.

In operation, data transfers for functions related to a specific subsystem are assigned to the same time slice. For instance, data transfers which control the operation and monitor the status of only the sprayer subsystem may be assigned to time slice 2. Then, every 32 ms when the system enters time slice 2 of a new sector, data corresponding to the sprayer system is transferred between controllers on the system.

More than one controller will communicate during a time slice. Each controller in the system knows the sector and time slice it is to read and write data. In one embodiment, bus master 12 begins each time slice by transmitting a sync byte and a status byte. Then, depending on the sector and time slice, another controller writes a byte to the bus.

Each controller is interrupted by a receive interrupt on reception of each byte transmitted. Therefore each controller has a mechanism for determining the number of bytes that have been sent in the time slice. This provides a mechanism for sharing the serial bus in a very flexible way. For example, bus master 12 may send the first two bytes in a time slice. The next one may be sent by base console 14, the next by sprayer console 30, and so on.

Data which changes fairly frequently will be transmitted at least once during each sector. Data which is expected to change more infrequently will be transmitted during one or two sector within a frame.

In one embodiment, time slice 0 is reserved for synchronization and broadcast data from bus master 12. Time Slice 15 (Ts15) is reserved for base console 14, monitor subsystem 20 and any subbase modules. Any module which is strictly a data gathering device (compass, altimeter, etc.) should be implemented as a subbase. The other 14 time slices are assigned to subsystems attached to bus 22.

If no program overhead is involved, up to 34 characters can be transferred during each time slice at 187.5 K baud. Each character sent on the TrakNet consists of 11 bits of 5.33 μS each. The first bit (Logical 0) is a Start bit used to frame the character.

The next 8 bits form the actual data being transferred and may include a Parity bit for error checking in position D7.

D8 is used by the 8051 in Communications Mode 2 to generate a Serial Interrupt. If D8 is a '1' (only in a SYNC byte), the receiving processor will be interrupted (if Int.'s are enabled). If D8 is '0', the processor will not be interrupted.

The last bit (Logical 1) is the Stop bit and signals the receiver that the complete character is received.

Time Slice 0

Time Slice 0 (Ts0) of each Sector is reserved for synchronization and general data used by many systems within the network. This data is transmitted by bus master 12. A Group of data (designated as Group 0) will be included in every Sector and Mode. Other data and the number of bytes transmitted will vary according to the Sector number.

Group 0 and other Groups are defined below. Selected bytes of Ts0 data will contain 7 data bits and a Parity bit. The first byte sent (SYNC) will have its 9th bit set to cause a Serial Interrupt. All other bytes must have the 9th bit reset.

Group 0 data is placed on the Network at the beginning of Ts0. As stated above, the first byte sent is a SYNC byte consisting of the Ts number (0 in this case) and Parity. Bit 9 will be set which will cause an interrupt of all modules set for 8051 Mode 2.

The second byte sent will contain the current Sector Number (0-7) in Bits 4 to 6 and the current System mode of operation in bits 0 to 3. This Byte includes a Parity Bit in Bit 7.

| System modes are defined as follows: | |
| --- | --- |
| 0000 = Normal | 1000 = Debug |
| 0001 = Initialize | 1001 = Undefined |
| 0010 = Σ = O | 1010 = Undefined |
| 0011 = Σ = A | 1011 = Undefined |
| 0100 = Base Console Calibrate | 1100 = Undefined |
| 0101 = PC Calibrate | 1101 = Undefined |
| 0110 = SubBase Calibration | 1110 = Reserved |
| 0111 = Network Calibration | 1111 = Reserved |

The remaining bytes in this Group are: Flag byte (from LSB: Key, Run, Minus, Plus, NetHold, Power Bad, BadSpeed, On14), Speed (offset, −29.5 to +206 kpH in mm./S), Distance (Rotating, 10ths of a mm) and Acceleration (signed ±3.34 g in mm/S$^2$). The origin of the actual data may vary according to the devices attached. The data transmitted during the variable portion of Ts0 changes according to the Sector number within the Frame.

Group 1 data is not needed as frequently as Group 0 data and is sent only during sectors 0 and 4. During Ts0 of sectors 0 and 4, additional bytes of data are appended to the end of Group 0. Group 1 data are: Heading (±180° in 0.0055° steps), Normal Attitude (±32° in 0.001° steps) and Lateral Attitude (±32° in 0.001° steps).

Group 2 is appended to end of Group 0 only during sector 1. The data available in this Group are: Date and Time (BCD, Minute, Hour, Day, Month).

Group 3 is appended to the end of Group 0 only during Sector 2. The additional data in this Group are: Width (mms, 313 format), Altitude (−3 km to +13.7 km in mm).

Group 4 is appended to the end of Group 0 only during Sector 3. The additional data in this Group includes Time Calibration Marker.

Group 5 is appended to the end of Group 0 only during Sector 6. Group 5 data are: Configuration byte (Metric, US, UK, Turf, Security Undefined, Undefined, Voice), Operator entered Low, High and Test Speeds (MPH or kmPH, 1 byte 313 Format), Air Temperature (−48° to +80° C., ½° steps) and Ground Temperature (−24° to +40° C., ¼° steps).

Time Slice 15

Bus master 12, base console 14, monitor subsystem 20 and any other module or subsystem which is strictly a data gathering device communicate during Time Slice 15 (Ts15) using a fixed protocol.

Bus master 12 and base console 14 gather and provide most of the information sent on communication bus 22 during Ts0. Bus master 12 handles scheduling and the synchronization of transmission while base console 14 does the display of error messages, etc. They also may handle accumulation and calculation of some data.

As in any other time slice, the first character transmitted by bus master 12 during Ts15 is a sync character. In the case of Ts15, the sync character will have a fifteen encoded into its time slice nibble. The second and third characters are also generated by bus master 12. The second character contains a number indicating the Active System for error handling or calibration. The third character includes system status such as calibration mode, run./hold status, speed sensor location and error status.

In Normal Mode, the Active System is set to the system number of the device selected for Error display or to zero if no system is requesting an Error display.

In Network Calibrate Mode, the Active System is set to the system number of the system selected for calibration or to zero if no system is to be calibrated.

In Subbase Calibrate Mode, the Active System is set to the subbase number of the subbase selected for calibration or to zero if no subbase is to be calibrated. The subbase number of bus master 12 is one.

While bus master 12 is sending the first three characters, base console 14 is preparing to send the fourth. When base console 14 receives the third character, it knows that bus 22 is clear and it transmits the fourth character. This character contains base console status such as key status, run./hold status, power supply status and error status. If the current sector is either 0 or 4, base console 14 then sends two characters describing the circumference of the wheel in tenths of mm (used only for magnetic speed sensors) and a character indicating the time slice assigned to the subsystem supplying system width data.

All other Time Slices

Time Slice X is any Time Slice other than 0, 14 or 15. These are reserved for the Systems attached to the network to communicate. (One exception is SubBase Calibrate mode. See below.) The protocol other than the first 3 bytes is defined by the individual systems.

The first two characters transferred during Time Slice X are generated by bus master 12 and consist of a sync character and a status character. The sync character will have a X encoded into its time slice nibble. The status character uses only a single bit. Bit 0 in the second character of Time Slice X is used to acknowledge to the subsystem console that an error message sent to the bus master 12 during a previous Time Slice was received and is being displayed. The subsystem console should remove that Error request immediately, but continue to display it until the acknowledge bit is cleared. The subsystem console can then request to display a different message in a subsequent time slice. Bus master 12 will handle all error messages in a FIFO Queue with only one entry per system until all are Acknowledged. The subsystem console must therefore continue to transmit the error message until it is explicitly acknowledged or is no longer present.

Bus master 12 allocates three seconds for display of an error. The error sourcing subsystem sends the error displayed periodically over the three seconds and then clears the error in response to a clear error command received from bus master 12.

While bus master 12 is sending the first two characters, the subsystem console associated with the current time slice is preparing to send the third. When the subsystem console receives the second character, it knows that bus 22 is clear and it transmits the third character. If the subsystem has an error pending the console places the module number of the module in error in the low nibble of the character. If a visual alarm indicator is requested, bit 6 of the third character is set; if an audible alarm is requested, bit 4 of the third character is set.

The remaining characters in Time Slice X depend on the mode of operation and the subsystem involved.

System Operation

Initialization Mode

System operation parameters are stored to EEPROM automatically on power down. Therefore, during initialization mode, system parameters are read from EEPROM and distributed to the appropriate destinations. This includes such information as assigned time slice, module number of the module associated with a specific subsystem and the like. Module number is important since system 10 could be used to track more than one spraying subsystem 16, one planter subsystem 18 or one monitor subsystem 20 at a time. During calibration (explained below) the module number of each module in system 10 is associated with its appropriate subsystem.

In addition, diagnostic routines are executed during initialization mode. In particular RAM read/write tests are performed by each controller and a checksum test is performed on ROM.

The first two characters transferred in a time slice during initialization mode are generated by bus master 12 and consist of a sync character and a status character. The status character is used by bus master 12 will inform the appropriate unit that it is responsible for supplying the network with width. This is done by setting bit 6 of the status character during initialization mode.

Normal Mode

A system that has successfully completed initialization mode enters the normal mode of operation. In the normal mode of operation, traffic on the serial bus follows a regular pattern. Typically, status is sent each time the appropriate sector, time slice and character comes around while operating commands are sent only once. Errors are handled as above.

A spraying system operating in normal mode will be described. On exiting initialization mode, base console 14 will display ground speed, a speed bar scale, distance traveled and two area counters Distance traveled and the two area counters will contain the values present the last time system 10 was turned off. Likewise, each of the other console screens will display their normal screen displays.

In the preferred embodiment, operation of the spraying system commences when ground movement is detected. Ground speed is transferred from the appropriate sensor source (base console 14 or bus master 12) during Ts0. It is displayed on the display screen of base console 14 and used to calculate distance traveled, operating hours and area covered. Boom solenoid valve status, sprayer operating pressure, etc. are transmitted from the appropriate accessory modules and displayed on sprayer console 30. The pattern of the spray applied can be recorded by monitor subsystem 20 for later review or playback.

Sigma Mode ($\Sigma = 0$ and $\Sigma = A$)

Since counter values are among the values saved to EEPROM on power down, a mechanism is needed for modifying the contents of a counter. Sigma mode provides that function. Sigma mode ($\Sigma = 0$) is used to clear counters. Sigma mode ($\Sigma = A$) is used to set a counter to a desired preset value.

The first two characters transferred in a time slice during Sigma Mode are generated by bus master 12 and consist of a sync character and a status character. Only a single bit is defined in the status character, the bit in the LSB position Only one subsystem will be valid for a Sigma Mode (either Clear or Adjust) at one time. To notify a subsystem when it becomes active, bit 0 of the status character is set by the bus master 12 at the appropriate time slice.

Subsystems request service during Sigma mode with the third character in their time slice. If a subsystem console is requesting Sigma (initiated by a change in a subsystem console switch setting), the third character will be set to a non-zero value. After being selected for a Sigma operation, and being adjusted or cleared, this character is set to zero in order to notify the bus master 12 that another subsystem may be selected.

During Sectors 0 and 4, the selected subsystem console will send a fourth character of data to base console 14 to be displayed. This contains the number of the Module which contains the Data being cleared or adjusted. The subsystem console must continue to send this character until bit 0 of the status character is cleared.

Base Console Calibrate Mode

This mode is used to calibrate base console 14. The first two characters transferred in a time slice during Base Console Calibration Mode are generated by bus master 12 and consist of a sync character and a status character. Only bit 1 is defined in the status character. If bit 1 is set, a longer, more extensive setup calibration has been requested by console 14.

The subsystem console will transmit a zero for the second character in all cases except when a switch setting has changed since the previous transmission. The second character is then changed to a non-zero value for a single transmission to notify base console 14 of the change.

The base console is calibrated by selecting base console calibration at primary user interface 24. The first value calibrated is the contrast of the base console display. The next is the system units (metric, American English, United Kingdom English or turf industry). Next, if the base console is connected to a network, the system number of the console whose width will be used for the primary area calculation is entered. If the base console is not connected to a network, the width is entered at the base console.

Next the polarity of the remote run/hold sensor is entered, the wheel circumference of the speed sensor, the selection of the display of distance or operating hours, the maximum speed expected, the minimum speed expected and a test speed. The test speed provides a ground speed that can be used to simulate vehicle movement in system setup. These calibration values are saved to nonvolatile memory when the system is powered down.

PC Calibrate Mode

This mode is intended to be used to permit the calibration of a system 10 with values downloaded from memory card reader 134. This would permit the equipment operator to preplan an application, save data corresponding to the plan and then execute the plan on system 10.

Network Calibration Mode

Only one subsystem will be calibrated at a time. The first two characters transferred in a time slice during Network Calibration Mode are generated by bus master 12 and consist of a sync character and a status character. Two bits are defined in the status character. If bit 0 is set, that subsystem has been selected for subsystem calibration. If bit 1 is set, a longer, more extensive setup calibration has been requested by console 14.

Each subsystem needing calibration will request it through use of the third character in its time slice. If a subsystem console is requesting a Calibration (initiated by the operator moving a console switch), the third character will be set to a non-zero value. In one embodiment, this value can be used by the Active system for coordinating calibration among modules of the subsystem. The bus master will accept any non-zero value as a request. When Calibration is no longer desired, setting this byte to 0 will notify the bus master 12 that another subsystem may be selected.

During Sectors 0 and 4, the selected subsystem module will send three bytes of data to base console 14 to be displayed. The first byte is sent as the fourth character in the time slice. It contains the Module # of the module being calibrated (lower nibble) and Data type (upper). The next two bytes are Data bytes. Up to 16 data types and combinations are possible with 7 defined as follows:

| | |
|---|---|
| 0000 | 2 byte 313 code. LSB first. |
| 0001 | Fixed Decimal Point. LSB first, 3 MS bits of 2nd byte = punctuation code for base console 14. |
| 0010 | Integer Data. LSB 1st. Displayed without punctuation. |
| 0011 | Hex Display. LSB 1st. Display as 4 Hexadecimal digits. |
| 0100 | Integer/Symbol. 1st byte = Integer byte. 2nd = Symbol code. Bit 0 = Triangle, Bit 1 = Alarm, Bit 2 = Gears Open, Bit 3 = Gears Closed, Bit 6 = No Flash, Bit 7 = Symbols only, no integer. |
| 0101 | Character. Seven-segment data to display. |
| 1111 | No data available yet, delay display. |

The value 00 in the first byte will cause base console 14 to blank the LCD. The subsystem console must continue to send the three bytes of data during sectors 0 and 4 to base console 14 until the bit 0 of the status character is cleared.

Network calibration will next be described in the context of a spraying system. The sprayer console is calibrated by selecting calibration mode at primary user interface 24 and then toggling any switch on the sprayer console. Selecting calibration mode causes base console 14 to notify bus master 12 that calibration mode has been selected. Bus master 12, in turn, transmits a system mode equals Network Calibration as part of its status character. When a switch is toggled on the face of sprayer console 30, console 30 transmits that event to bus master 12. If this was the only console with a switch toggled, bus master 12 notifies console 30 that it is in calibration mode.

The first value calibrated is the contrast of the sprayer console display. Next values are entered for the subsystem address, the accessory module 32 or 33 serial number, the minimum flow specified for the flowmeter selected, a flow calibration number stamped on the flowmeter calibration tag and the servo valve polarity (In-line = $NH_3$, By-pass = other). If an injection system is intended, carrier type and injection console serial number must be entered.

Next, the number of booms used is entered, the number of nozzles per boom, the nozzle spacing, the pattern width, the nominal pressure, the flow rate at nominal pressure and the specific gravity of the product. At each stage of calibration, a step can be skipped by just stepping by the calibration of the value.

After the specific gravity is entered, the low and high target pressures recommended by the nozzle manufacturer is entered, followed by the target application rate and a delta rate adjustment that allows the user to select the size of steps by which the target rate can be increased or decreased during normal operation.

Next, the pressure sensor is calibrated, tank size is entered, remote run/hold polarity is chosen and operation of the boost valve is selected.

If a direct injection spraying system is desired, sprayer console must be calibrated for the type of carrier and the serial number of the injection console to be used. This last number must be entered to differentiate one injection console from another in a multi-sprayer system.

Calibration of the injection console will be described next. The injection console is calibrated by selecting calibration mode at primary user interface 24 and then toggling any switch on the injection console. This mechanism is similar to that described in connection with calibration of the sprayer console above.

The first value calibrated is the contrast of the injection console display. Next, serial numbers are entered for up to four pump packs. Next, the four digit number from each pump pack chemical card is entered, along with the chemical abbreviation and specific gravity of the full strength chemical as specified by the manufacturer. Next, the maximum and minimum K factors attached to each pump pack, the tank sizes of each container 106 and a module label designating the type of carrier are entered.

Next, the user chooses whether this application will use area or carrier based injection, the minimum, maximum and target injection rates and the delta rate by which target rate can be increased or decreased during operation. Calibration of the direct injection spraying system is now complete.

SubBase Calibration Mode

During SubBase Calibrate, modules installed as subbases will take over the Time Slices normally used by the subsystems on the Network. The status character sent as the second character in the time slice is the same as Network Calibration except it is directed to the SubBase with the corresponding SubBase# instead of the subsystem console. Only one SubBase device will be valid for Calibration at one time. Each SubBase needing calibration will request it through use of the third character sent in the appropriate time slice.

When the bus master 12 selects a SubBase for calibration, it will communicate the Active Status to the device by setting bit 0 of the second character in the time slice. Bit 1 being set will signify an extended Setup calibration. Bit 1 cleared signifies Abbreviated calibration.

Subbases must request calibration if needed. To do this, the third character sent during the appropriate time slice is set to a non-zero value. After being selected for, and being calibrated, setting this byte to 0 will notify the bus master 12 that another SubBase may be selected. It is imperative that all subsystems which normally use the Time Slice refrain from sending anything while in this mode.

During Sectors 0 and 4, the Selected SubBase will send three bytes of data to base console 14 to be displayed. These bytes are the same as in Network Calibration.

Although the present invention has been described with reference to the preferred embodiments, those skilled in the art will recognize that changes may be made in form and detail without departing from the spirit and scope of the invention.

What is claimed is:

1. An apparatus for managing a plurality of agricultural devices, the apparatus comprising:
   memory means for storing program code and data used in operating one of the plurality of agricultural devices;
   user interface means for displaying status and control information associated with one of the plurality of agricultural devices and for receiving user modifications controlling operation of one of the plurality of agricultural devices;
   communicators network means for receiving and transmitting signals between a processor means and one of the plurality of agricultural devices, the signals relating to the operation of one of the plurality of agricultural devices; and
   processor means, electrically interconnected to said memory means, said user interface means, and said communications network means, for identifying each agricultural device to be managed, for accessing program code and data stored in said memory means associated with each identified agricultural device, for receiving status and control information from the user interface means, for generating control signals controlling one of the plurality of agricultural devices, for supplying the control signals to the communications interface means, and for providing status and control information to the user interface means;
   wherein one of the plurality of agricultural devices comprises spray control means or controlling transfer of a tank fluid from a sprayer tank to a spraying boom, the spray control means comprising:
   (a) fluid transfer means for transferring the tank fluid from the sprayer tank to the spraying boom, wherein the fluid transfer means comprises:
       (i) boom solenoid valve means for controlling the flow of tank fluid to the spraying boom;
       (ii) pump means, connected to and controlled by said boom solenoid valve means, or pumping fluid from the sprayer tank through a pump means input to a pump means output; and
       (iii) pump feedback means, connected to said pump means, for directing a portion of the tank fluid from the pump means output to the pump means input in order to control fluid pressure of the tank fluid;
   (b) pressure monitoring means for monitoring the fluid pressure of the tank fluid and for supplying a signal indicative of the pressure of the tank fluid to a fluid control means;
   (c) fluid flow monitoring means for monitoring flow of tank fluid to the spraying boom and supplying a signal indicative of a rate of flow of tank fluid to a fluid control means; and
   (d) fluid control means, connected to said pressure monitoring means and said fluid flow monitoring means, for controlling the flow of tank fluid, wherein the fluid control means comprises:
       (i) boom solenoid valve control means, responsive to control signals received from the processor means and connected to said boom solenoid valve, for controlling operation of said boom solenoid valve; and
       (ii) pump feedback control means, responsive to control signals received from the processor means and connected to said pump feedback, means for controlling the amount of tank fluid fed from the pump output means to the pump input means.

2. A vehicle-mounted, modular system for managing spraying and planting operations involving a plurality of agricultural devices including a farm implement and a sensor, the system comprising:
   a network, wherein the network comprises a bus master and means for communicating between devices connected to the network;
   a base console, connected to the network, wherein the base console comprises a first controller, first display means, connected to the first controller for displaying status and control information, user input means for receiving control instructions from a user, monitoring means for monitoring distance graveled by the vehicle and first network interface means, connected to the firs controller and the network, for transmitting and receiving messages on the network;

a subsystem accessory module including a second controller and device interface means, connected to the second controller, for receiving status information from and transmitting control information to one of the plurality of agricultural devices; and a subsystem console, connected to the network, wherein the subsystem console comprises a third controller, second display means, connected to the third controller, for displaying status and control information related to a subsystem, accessory module control means for exchanging status and control information with the accessory module and second network interface means, connected to the third controller and the network, for transmitting and receiving messages on the network.

3. A vehicle-mounted modular system according to claim 2 wherein the base console further includes means for detecting whether the farm implement is in operating position and means for calculating and displaying the area covered by the operation of the farm implement.

4. An apparatus for transferring fluid from a sprayer tank to a spraying boom mounted on a vehicle comprising:

(a) vehicle monitoring means for receiving information indicative of the speed of a vehicle on which a spray boom is mounted and supplying such information to a fluid control means;

(b) fluid transfer means capable of connection to a sprayer tank and the spraying boom comprising:
  (i) boom solenoid valve means capable of being connected to the spraying boom for controlling the flow of tank fluid to the spraying boom;
  (ii) pump means controlled by said boom solenoid valve means for pumping fluid from the sprayer tank from a pump means input to a pump means output; and
  (iii) pump feedback means connected to said pump means for directing a portion of the tank fluid from the pump means output to the pump means input to control the pressure of the tank fluid;

(c) pressure monitoring means for monitoring the pressure of the tank fluid supplied to the spraying boom and supplying a signal indicative of the pressure of the tank fluid to a fluid control means;

(d) fluid flow monitoring means for monitoring the flow of tank fluid to the spraying boom and supplying a signal indicative of the flow of tank fluid to a fluid control means; and (e) fluid control means interconnected to said vehicle monitoring means, said pressure monitoring means, said fluid flow monitoring means, and a user interface means for controlling the transfer of tank fluid comprising:
  (i) boom solenoid valve control means responsive to control signals received from a processor control means and connected to said boom solenoid valve for controlling operation of said boom solenoid valve;
  (ii) pump feedback control means responsive to control signals received from a processor control means and connected to said pump feedback means for controlling the amount of tank fluid fed from the pump output means to the pump input means; and
  (iii) processor control means for processing the signals received from the vehicle monitoring means, pressure monitoring means, and fluid flow monitoring means and generating control signals for said boom solenoid valve control means and said pump feedback control means; and (f) user interface means interconnected to said fluid control means for receiving control information relating to the flow of tank fluid and displaying information indicative of the flow of tank fluid.

5. The apparatus according to claim 4 wherein said fluid transfer means further comprises surge control means for controlling surges in pressure in the spray unit due to operation of said solenoid valve means.

6. The apparatus according to claim 5 wherein said surge control means comprises a boost solenoid valve used to direct a portion of tank fluid to bypass said pump feedback means and wherein said user interface means further comprises boost solenoid valve controlling means connected to said boost solenoid valve for damping surges in response to operation of the boom solenoid valve.

7. The apparatus according to claim 5 wherein said boom solenoid valve comprises a three way valve for directing tank fluid to a second output when tank fluid flow to the boom is to be shut off and wherein said surge control means comprises a manifold connected to said second output for directing the tank fluid back to the input of said pump means.

8. The apparatus according to claim 4 further comprising:

(g) direct injection means comprising:
  (i) a container means for holding a second fluid for mixing with the tank fluid; and
  (ii) injection pumping means connected to said container means for transferring the second fluid to an injection site at which the second fluid is mixed with the tank fluid;

(h) an injection interface means interconnected to said direct injection means for monitoring and controlling said injection pumping means in response to control signals received from an injection spraying control means; and (i) an injection spraying control means for monitoring operation of said injection control module and of said pumping means, said injection spraying controller pod being connected to said communicating means in order to transfer data between said injection spraying controller pod and said base console, said accessory module and said controller pod.

9. The apparatus according to claim 8 wherein said direct injection means further comprises:

card reader means for continuously sensing voids in a film of conductive ink deposited on a card;

a card connected to the container means and screened with a pattern in conductive ink, said pattern being indicative of the second fluid; and wherein said injection control module further includes means for monitoring the pattern printed on th card so as to modify operation of the injection unit.

10. A system for monitoring small discrete particles having a high dielectric constant, such as seeds, that pass along a path, the system comprising:

a network, wherein the network comprises a bus master and means for communicating between devices connected to the network;

a base console, connected to the network, wherein the base console comprises a first controller, first display means, connected to the first controller, for displaying status and control information, means for monitoring the distance traveled by the vehicle and first network interface means, connected to the first controller and the network, for transmitting and receiving messages on the network;

a planter monitor unit, comprising a sensor for detecting passage of a particle along the path;

a planter accessory module including a second controller and planter monitor interface means, connected to the planter monitor sensor and the second controller, for receiving signals, from the planter monitor unit sensor in response to detection of a particle by said sensor;

a planter controller pod including a third controller, second display means, connected to the third controller, for displaying status and control information, means for monitoring operation of said planer accessory module and second network interface means, connected to the third controller and the network, for transmitting and receiving messages on the network.

11. A method of identifying a first container from a plurality of containers, comprising:
providing card reader means for continuously sensing voids in a film of conductive ink deposited on a card;
depositing conductive ink in a pattern on a card;
attaching the card to the first container
associating the pattern of conductive ink on the card with the first container such that the first container can be identified by placing the card into the card reader means; and
orienting the card in the card reader means in order to continuously read the conductive ink pattern.

12. A method as in claim 11 wherein the method comprises the steps of:
providing memory means for storing data associated with the plurality of containers, wherein the data includes first data associated with the first container;
reading the conductive ink pattern on the card; and accessing said first data.

13. A distributed system for controlling a plurality of agricultural devices including agricultural implements and sensors, wherein the system comprises:
a plurality of consoles, including a base console and a subsystem console;
a network, connected to the plurality of consoles, wherein the network comprises communication means for communicating between the plurality of consoles;
a subsystem module, connected o the subsystem console, wherein the subsystem module comprises means or controlling one of the plurality of agricultural devices; and a bus master, connected to the network, wherein the bus master comprises means for synchronizing communication on the network through issuance of multi-processor synchronization commands;
wherein the base console comprises:
user interface means for receiving user commands and for displaying status and control information;
network interface means, connected to the network, for communicating over the network;
programing means, connected to the user interface means and the network interface means, for controlling the display of status and control information, for executing program code in response to user commands and for communicating with another console of the plurally of consoles; and
wherein the subsystem console comprises:
network interface means, connected to the network, for communicating over the network;
communication means for communicating with the subsystem module; and
programing means, connected to the network interface means and the subsystem module, for executing program code in response to user commands received by the base console and for communicating with another console of the plurality of consoles.

14. The distributed system according to claim 13, wherein the subsystem console further comprises user interface means for receiving user commands and for displaying status and control information; and
wherein the programing means comprises means, connected to the user interface means, of controlling display of the status and control information.

15. The distributed system according to claim 13, wherein the bus master further comprises means for collecting and organizing data received from each of the consoles.

16. The distributed system according to claim 13, wherein the base console programing means comprises memory; and
wherein the bus master further comprises means for identifying each agricultural device, means for accessing program code stored in the memory of the base console programing means for each agricultural device and means for generating control signals associated with each agricultural device based on the program code.

17. The distrusted system according to claim 13 wherein the plurality of consoles further includes a monitor console, connected to the network, for receiving and displaying information regarding operation of one of the subsystem consoles and wherein the system further comprises an input/output accessory console, connected to the monitor console, for recording the information received on a removable storage medium.

18. The distributed system according to claim 13, wherein the communication means comprises a time slice communications protocol implemented on a half-duplex serial line.

* * * * *

UNITED STATES PATENT AND TRADEMARK OFFICE
CERTIFICATE OF CORRECTION

PATENT NO. : 5,260,875

DATED : November 9, 1993

INVENTOR(S) : S. David Tofte, Richard Heiniger, and Steven W. Vogel

It is certified that error appears in the above-indentified patent and that said Letters Patent is hereby corrected as shown below:

On the title page item [75], delete "David S." and insert --S. David--.

Column 7, line 20, delete "modulated".

Column 15, line 68, after the word "enable" insert --\--.

Column 17, line 9, delete "sector" and insert --sectors--.

Column 20, line 6, after the numeral "12" insert --and--.

Column 20, line 21, after the word "counters" insert --.--.

Column 20, line 49, after the word "position" insert --.--.

Column 23, line 64, delete "communicators" and insert --communications--.

Column 24, line 25, delete "or" and insert --for--.

Column 25, line 1, delete "graveled" and insert --traveled--.

Column 27, line 59, delete "o" and insert --to--.

Column 28, line 33, delete "programing" and insert --programming--.

Column 28, line 34, delete "of" and insert --for--.

UNITED STATES PATENT AND TRADEMARK OFFICE
CERTIFICATE OF CORRECTION

PATENT NO. : 5,260,875

DATED : November 9, 1993

INVENTOR(S) : S. David Tofte, Richard Heiniger, and Steven W. Vogel

It is certified that error appears in the above-indentified patent and that said Letters Patent is hereby corrected as shown below:

Column 28, line 41, delete "programing" and insert --programming--.

Column 28, line 50, delete "distrusted" and insert --distributed--.

Signed and Sealed this

Thirty-first Day of October 1995

*Attest:*

BRUCE LEHMAN

*Attesting Officer*     *Commissioner of Patents and Trademarks*